US008737587B2

(12) United States Patent
Clark et al.

(10) Patent No.: US 8,737,587 B2
(45) Date of Patent: May 27, 2014

(54) METHOD, COMMUNICATION DEVICE AND COMPUTER-READABLE MEDIA FOR CONVEYING AN AUDIO ELEMENT TO A USER OF A COMMUNICATION DEVICE DURING AN OUTGOING CALL

(75) Inventors: David William Clark, Carp (CA); Sean MacLean Murray, Ottawa (CA)

(73) Assignee: BCE Inc., Verdun (CA)

( * ) Notice: Subject to any disclaimer, the term of this patent is extended or adjusted under 35 U.S.C. 154(b) by 222 days.

(21) Appl. No.: 12/983,206

(22) Filed: Dec. 31, 2010

(65) Prior Publication Data

US 2011/0176668 A1     Jul. 21, 2011

Related U.S. Application Data

(60) Provisional application No. 61/291,833, filed on Dec. 31, 2009.

(51) Int. Cl.
*H04M 3/42*          (2006.01)
(52) U.S. Cl.
USPC ..................................................... 379/207.16
(58) Field of Classification Search
USPC ........................................ 379/201.01, 207.16
See application file for complete search history.

(56) References Cited

U.S. PATENT DOCUMENTS

| | | |
|---|---|---|
| 4,811,382 A | 3/1989 | Sleevi |
| 5,321,740 A | 6/1994 | Gregorek et al. |
| 7,006,608 B2 | 2/2006 | Seelig et al. |

(Continued)

FOREIGN PATENT DOCUMENTS

| | | |
|---|---|---|
| EP | 2157767 A1 | 2/2010 |
| WO | WO-2005/048571 A2 | 5/2005 |

(Continued)

OTHER PUBLICATIONS

Written Opinion of the International Searching Authority and International Search Report mailed on Oct. 5, 2010 in connection with PCT patent application PCT/CA2009/001908.

(Continued)

*Primary Examiner* — Creighton Smith
(74) *Attorney, Agent, or Firm* — Sean Murray; Murray IP Consulting Inc.

(57) ABSTRACT

The present invention discloses numerous implementations for conveying an audio element to a source device initiating an outgoing call while a user of the source device is waiting for a user of a destination device to answer the call. A call processing system receives a call request message from the source device, determines an audio element from a plurality of audio elements to convey to the source device and initiates conveyance of the audio element to the source device in response to receiving the call request message. The system then causes establishment of a media connection between the source and destination devices and terminates conveyance of the audio element to the source device prior to or substantially simultaneous with the establishment of the media connection between the source and destination devices. In various implementations, the source device may be implemented within the PSTN and/or an IP network. The audio element may comprise an audio file, an audio stream, scheduling information or other audio content. A subscriber associated with the source device may pre-configure the selection of the audio element to be conveyed in replace of the traditional ring tone. A communication device may also implement a method to convey an audio element to a user of the communication device during establishment of an outgoing call.

70 Claims, 15 Drawing Sheets

(56) References Cited

U.S. PATENT DOCUMENTS

| | | |
|---|---|---|
| 7,076,445 B1 | 7/2006 | Cartwright |
| 7,212,520 B2 | 5/2007 | Luciano, III |
| 7,360,090 B1 | 4/2008 | Doskow et al. |
| 7,474,432 B1 | 1/2009 | Kirchhoff et al. |
| 7,512,421 B2 | 3/2009 | Kim et al. |
| 7,616,954 B2 | 11/2009 | Jiang |
| 8,126,126 B2 | 2/2012 | Haley et al. |
| 8,126,456 B2 * | 2/2012 | Lotter et al. ............... 455/432.3 |
| 8,130,930 B2 | 3/2012 | Dement |
| 8,134,920 B2 | 3/2012 | Imajuku et al. |
| 8,155,293 B2 | 4/2012 | Tiliks et al. |
| 2003/0147522 A1 * | 8/2003 | Elazar ..................... 379/265.06 |
| 2006/0083364 A1 | 4/2006 | Bossemeyer et al. |
| 2006/0109969 A1 * | 5/2006 | Oh .......................... 379/207.16 |
| 2006/0280165 A1 | 12/2006 | Blumenschein et al. |
| 2007/0064886 A1 | 3/2007 | Chiu et al. |
| 2007/0077918 A1 | 4/2007 | Nguyen et al. |
| 2007/0116221 A1 | 5/2007 | Kim |
| 2007/0121914 A1 | 5/2007 | Pearson |
| 2007/0154004 A1 | 7/2007 | Daigle |
| 2007/0189497 A1 | 8/2007 | Bareis |
| 2007/0201451 A1 | 8/2007 | Bennett |
| 2007/0206747 A1 | 9/2007 | Gruchala et al. |
| 2008/0037740 A1 * | 2/2008 | Yoakum et al. .......... 379/142.01 |
| 2008/0051068 A1 * | 2/2008 | Frew et al. ................. 455/414.1 |
| 2008/0052206 A1 | 2/2008 | Edwards et al. |
| 2008/0130628 A1 | 6/2008 | Lin et al. |
| 2008/0130841 A1 * | 6/2008 | Pan et al. ........................ 379/87 |
| 2008/0220813 A1 | 9/2008 | Brown et al. |
| 2008/0260119 A1 | 10/2008 | Marathe et al. |
| 2009/0022141 A1 | 1/2009 | DeLorme et al. |
| 2009/0185669 A1 * | 7/2009 | Zitnik et al. ............. 379/217.01 |
| 2009/0290696 A1 * | 11/2009 | K. N. ....................... 379/142.04 |
| 2010/0067671 A1 * | 3/2010 | Cotignola et al. .......... 379/93.09 |
| 2010/0074138 A1 * | 3/2010 | Hara et al. .................... 370/252 |
| 2010/0098232 A1 * | 4/2010 | Wu et al. .................. 379/207.16 |
| 2010/0217600 A1 * | 8/2010 | Lobzakov ..................... 704/260 |
| 2010/0234021 A1 | 9/2010 | Ngai et al. |
| 2010/0322392 A1 * | 12/2010 | Walker et al. .............. 379/88.11 |
| 2011/0099478 A1 * | 4/2011 | Gallagher et al. ............ 715/735 |
| 2011/0269424 A1 * | 11/2011 | Multer et al. ................. 455/411 |
| 2011/0311037 A1 * | 12/2011 | Zampiello ................ 379/207.16 |
| 2012/0178504 A1 * | 7/2012 | Sweeney et al. ............. 455/567 |
| 2012/0214465 A1 * | 8/2012 | Piccionelli et al. ........... 455/418 |

FOREIGN PATENT DOCUMENTS

| | | |
|---|---|---|
| WO | WO-2007/060227 A2 | 5/2007 |
| WO | WO-2008/130709 A2 | 10/2008 |
| WO | WO-2009/125418 A2 | 10/2009 |

OTHER PUBLICATIONS

Written Opinion of the International Searching Authority and International Search Report mailed on Apr. 29, 2011 in connection with PCT patent application PCT/CA2010/002078.

Dialogic Corporation, Application Note: Color Ring Back Tone—Building Feature-Rich Wireless Applications with Dialogic Signaling Solutions, 2007, 14 pages.

Audiocodes Ltd., Application Description: Voice and Music RIng Back Tone Application for Wireless and Wireline Operators, 2004, 13 pages.

Wikipedia (Authors Unknown), Ringback Tone, http://en.wikipedia.org/wiki/Ringback_tone, downloaded Jun. 14, 2011, 3 pages.

* cited by examiner

| | Source 904 | Audio Element(s) 906 | Conditions 908 |
|---|---|---|---|
| 902₁ | 416-888-1234 | Led Zeppelin - Kashmir | ------ |
| 902₂ | 613-777-4321 | MP3 Playlist @ URL | Random |
| 902₃ | 613-777-2222<br>613-333-2222 | Economist Blog<br>CBC Radio 3<br>Jazz Compilation | Morning<br>Afternoon<br>Evening |
| 902₄ | 24.114.111 | Memo to Fred<br>Birthday Reminder | Fred's Contact #<br>Within 2 Days |
| ⋮ | | | |
| 902ₙ | 6139992345@bell.ca | Weather Network | Destination Area Code |

FIGURE 9

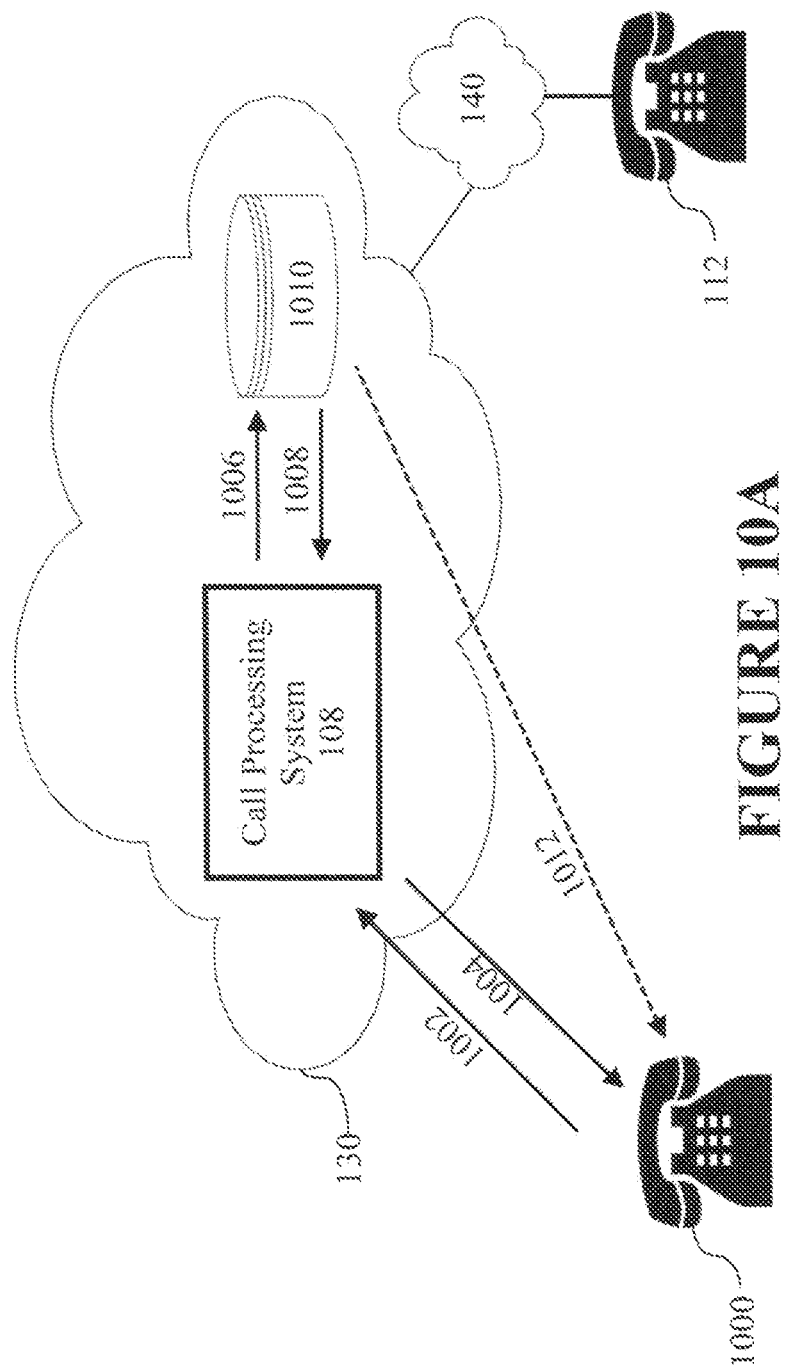

METHOD, COMMUNICATION DEVICE AND COMPUTER-READABLE MEDIA FOR CONVEYING AN AUDIO ELEMENT TO A USER OF A COMMUNICATION DEVICE DURING AN OUTGOING CALL

CROSS-REFERENCE TO RELATED APPLICATION

The present application claims the benefit under 35 USC 119 of U.S. Provisional Patent Application 61/291,833, filed on Dec. 31, 2009 and hereby incorporated by reference herein.

FIELD OF THE INVENTION

The invention relates generally to telecommunications and, more particularly, to method, communication device and computer-readable media for conveying an audio element to a user of a communication device during an outgoing call.

BACKGROUND

The Public Switched Telephone Network (PSTN) that has been the backbone of telephony communications for a century is transforming rapidly. Since the 1970s, the PSTN has been controlled through a set of signaling protocols called Signaling System #7 (SS7) developed by the International Standardization Sector (ITU-T) of the International Telecommunication Union (ITU). SS7 is also known variously as Common Channel Signaling System 7 (CCSS7), C7, Number 7 and CCIS7. The SS7 network manages the setup and teardown of telephone calls being placed from Plain Old Telephone Service (POTS) telephones through telephone exchange switches such as Digital Multiplex System (DMS) switches manufactured by Nortel Networks Corporation of Brampton, Canada.

In the past two decades, Voice over Internet Protocol (VoIP) technologies have emerged that directly compete with the well established Plain Old Telephone Service (POTS) telephony system. In VoIP networks, telephone terminals are coupled to Internet Protocol (IP)-based networks, such as the Internet or private IP networks, and telephone calls are managed with the use of call processing servers, often called soft switches. The well-established protocol for use with voice or video calls over IP-based networks is called Session Initiation Protocol (SIP).

VoIP calls controlled by SIP and POTS calls controlled by SS7 each currently have advantages and disadvantages. VoIP calls utilize the non-dedicated nature of IP-based networks to transmit voice packets in an efficient manner via a mesh of routers while POTS calls are dedicated connections via digitally switched circuits. This distinction typically provides operational cost advantages to VoIP (and hence lower prices) while also in some circumstances diminishing the quality and security of the VoIP telephone connection as compared to the traditional POTS connection.

Another significant distinction between the two telephony technologies is the flexibility that is often built into the soft switches and SIP used to manage the VoIP call as compared to the traditional telephone exchange switches, such as the DMS, and SS7 protocols. While a number of call service features were launched on the DMS (ex. call forward, call waiting etc.), the introduction of VoIP and its flexibility has led to significant developments in call service features. For example, web-based control of call routing which triggers multiple telephone terminals to ring simultaneously or in sequence is common within VoIP environments.

Despite the advantages of VoIP, a large portion of telephone consumers are remaining with POTS telephones. This is due to many factors including call quality, limitations on 911 services within VoIP and unwillingness to switch from the security of having a communication system in their home/office that has proven over time to be highly reliable, even during power outages. One downside to this reliance on POTS technology is that these consumers often cannot be offered new call service features that are available within VoIP systems. Further, in many circumstances, the call processing and management of the call service features within POTS networks may cost the service provider more compared to similar call processing and call feature management within VoIP networks.

One call feature that has been growing in popularity over the past decade is customized ring tones, in which a telephone subscriber can download audio files (ex. jingles, segments of music songs) onto their telephone to use as an incoming call notification. In some cases, the telephone subscriber may have multiple ring tones available and assign particular ring tones to particular potential calling parties. In so doing, the subscriber can in some circumstances determine who is calling based upon the ring tone. To date, customized ring tones have primarily been focused on subscribers with wireless telephones. They have not been widely adopted within POTS or VoIP phones likely due to many factors including technical limitations on the physical devices and both technical and policy limitations on the networks involved (ex. PSTN, private corporate IP networks).

Customized ring tones today are focused on incoming call notification. A user that initiates a telephony call on a source device hears a traditional ring tone while a user that receives the telephony call on a destination device may hear the customized ring tone. While the user that receives the telephony call may gain entertainment and/or information from the ring tone that he/she hears, the user that initiated the telephony call will not receive entertainment or information beyond whether the destination device is "ringing" (when actually it may be playing a customized ring tone) or whether the destination device is unavailable ("busy signal").

Against this background, there is a need for solutions that will mitigate at least one of the above problems, particularly enabling additional call features for the user that initiates a telephony call.

SUMMARY OF THE INVENTION

According to a first broad aspect, the invention seeks to provide a method implemented by a communication device. The method comprises: determining an audio element from a plurality of audio elements to convey to a user of the communication device during establishment of an outgoing call; initiating conveyance of the audio element to the user of the communication device in response to detecting an initiation of a call to a destination device by the user of the communication device; and terminating conveyance of the audio element to the user of the communication device prior to or substantially simultaneous with establishment of the call between the communication device and the destination device.

According to a second broad aspect, the invention seeks to provide a communication device comprising a network interface operable to be coupled to a network over which the communication device may initiate a call to a destination device; and a processing entity. The processing entity is operable to determine an audio element from a plurality of audio elements to convey to a user of the communication device during establishment of an outgoing call; to initiate conveyance of the audio element to the user of the communication device in response to detecting an initiation of a call to a destination device by the user of the communication device; and to terminate conveyance of the audio element to the user of the communication device prior to or substantially simultaneous with establishment of the call between the communication device and the destination device.

According to a third broad aspect, the invention seeks to provide a computer-readable media containing a program element executable by a communication device. The computer-readable media comprises first, second and third program codes. The first program code is for determining an audio element from a plurality of audio elements to convey to a user of the communication device during establishment of an outgoing call. The second program code is for initiating conveyance of the audio element to the user of the communication device in response to detecting an initiation of a call to a destination device by the user of the communication device. The third program code is for terminating conveyance of the audio element to the user of the communication device prior to or substantially simultaneous with establishment of the call between the communication device and the destination device.

According to a fourth broad aspect, the invention seeks to provide a method implemented by a communication device. The method comprises: receiving a selection of an audio element from a user of the communication device; initiating conveyance of the audio element to the user of the communication device in response to detecting an initiation of a call to a destination device by the user of the communication device; and terminating conveyance of the audio element to the user of the communication device prior to or substantially simultaneous with establishment of the call between the communication device and the destination device.

According to a fifth broad aspect, the invention seeks to provide a communication device comprising a network interface, a user interface and a processing entity. The network interface is operable to be coupled to a network over which the communication device may initiate a call to a destination device. The user interface is operable to receive a selection of an audio element from a user of the communication device. The processing entity is operable to initiate conveyance of the audio element to the user of the communication device in response to detecting an initiation of a call to a destination device by the user of the communication device; and to terminate conveyance of the audio element to the user of the communication device prior to or substantially simultaneous with establishment of the call between the communication device and the destination device.

These and other aspects of the invention will become apparent to those of ordinary skill in the art upon review of the following description of certain embodiments of the invention in conjunction with the accompanying drawings.

BRIEF DESCRIPTION OF THE DRAWINGS

A detailed description of embodiments of the invention is provided herein below, by way of example only, with reference to the accompanying drawings, in which:

FIG. 9 is a logical diagram of a sample database for use with a call feature according to embodiments of the present invention;

FIGS. 10A and 10B are simplified network block diagrams illustrating two example scenarios for conveying an audio element to a source device using the call processing system of FIG. 2;

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

The present invention is directed to method, call processing system, communication device and computer-readable media for conveying an audio element to a source device during an outgoing call. As depicted in detail below, within embodiments of the present invention, telephony calls that are initiated by a source device may be controlled by a call processing system within a packet-switched network, such as an IP network. The call processing system can convey an audio element to the source device prior to establishing the outgoing call with the destination device to replace the traditional ring tone that a user of the source device would normally hear. As described herein in detail, the audio element may be of numerous different forms and the call processing system may convey the audio element to the source device in a variety of manners. Further, as described herein, the source device may be implemented within a network controlled by the SS7 protocol such as the PSTN or a network controlled by another protocol such as SIP. A subscriber associated with the source device may pre-configure the selection of the audio element to be conveyed in replace of the traditional ring tone. A communication device may also implement a method to convey an audio element to a user of the communication device during establishment of an outgoing call.

Figure 1:
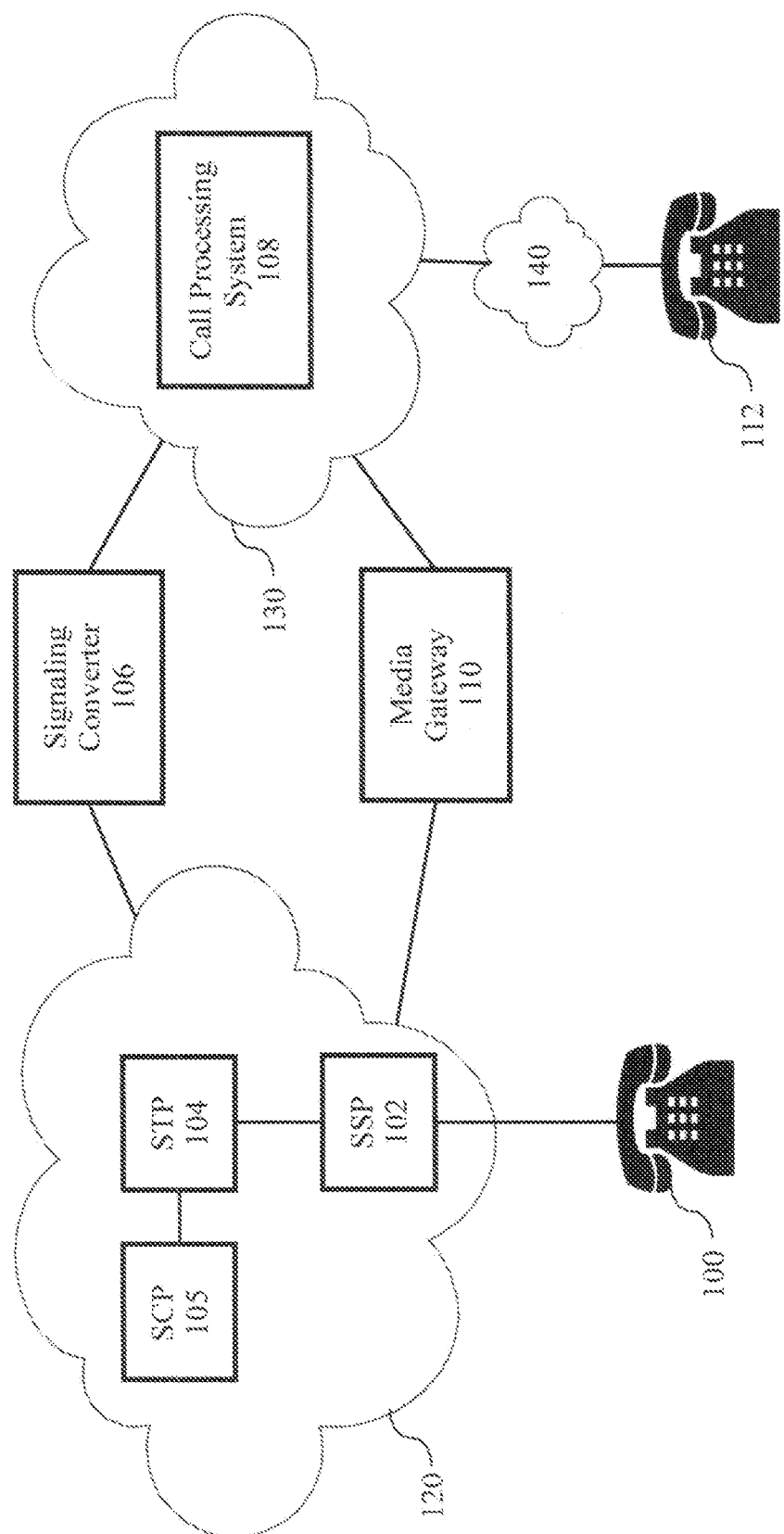
FIG. 1 is a network architecture block diagram according to an embodiment of the present invention.

FIG. 1 is a network architecture block diagram according to an embodiment of the present invention. FIG. 1 includes a Public Switched Telephone Network (PSTN) 120 which allows users of communication devices, such as a first communication device 100, to effect telephonic communications (ex. receive and originate calls). Various types of communication devices may be used by users to effect telephonic communications over the PSTN 120. For example, in various embodiments, a communication device used by a user (such as communication device 100) may be a wired Plain Old Telephony System (POTS) phone (including a cordless phone), a wireless phone (ex. a cellular phone or other mobile communication device, including a telephony-enabled Personal Digital Assistant (PDA)) or another communication device that can either directly or through another network interconnect with the PSTN 120.

As shown, the first communication device 100 is coupled to a Service Switching Point (SSP) 102. The SSP 102 is further coupled to one or more Signal Transfer Points (STPs), such as STP 104, and the STP 104 is further coupled to one or more Service Control Points (SCPs), such as SCP 105. One skilled in the art would understand the normal operation of the SSP 102, STP 104 and SCP 105 in establishing well-known telephonic communications between the communication device 100 and another communication device within the PSTN or within a VoIP network. The SSP 102 is a telephone switch equipped with SS7-capable software which terminates signaling links. The SSP 102 would generally originate, terminate or switch telephonic calls for wireline or wireless communication devices. In the case of wireless communication devices, the SSP 102 may comprise a wireless network switch or may comprise a plurality of entities that together allow a wireless communication device to originate, terminate or switch telephonic calls. The STP 104 is a packet switch of the SS7 network that receives and routes incoming signaling messages towards the proper destination and performs specialized routing functions. The SCP 105 is a database that provides information necessary for advanced call-processing capabilities. In one example, the SSP 102 can be implemented with a DMS-100 (Digital Multiplex System-100) telephone switch produced by Nortel Networks of Brampton, Canada; the STP 104 can be implemented with a Broadband STP produced by Nortel Networks of Brampton, Canada; and the SCP 105 can be implemented with an ISCP System produced by Telcordia Technologies Inc. of Piscataway, N.J.

Further shown in FIG. 1, a signaling converter 106 and a media gateway 110 are each coupled between the PSTN 120 and a data network 130. In this implementation, the data network 130 is based on the IP standard and therefore will be herein referred to as IP network 130, though data networks with alternative routing protocols could be used. The signaling protocol used within the IP network 130, according to some embodiments of the present invention, is Session Initiation Protocol (SIP), a well-known standard for Voice-over-Internet Protocol (VoIP) signaling. Therefore, the signaling converter 106 is an SS7/SIP converter in example embodiments described herein, as its primary purpose is to translate between SS7 signaling messages within the PSTN 120 and SIP messages within the IP network 130. One example product that can operate as the signaling converter 106 is an Internetwork Services Signaling Gateway (ISSG) produced by Nortel Networks Inc. of Brampton, Canada. The media gateway 110 is a PSTN/IP gateway in example embodiments described herein, as its primary purpose is to couple media connections (ex. voice circuits) within the PSTN 120 with media connections in the IP network 130. One example product that can operate as the media gateway 110 is a Packet Voice Gateway (PVG) produced by Nortel Networks Inc. of Brampton, Canada.

Also depicted within FIG. 1 is a call processing system 108 within the IP network 130 which can communicate with both the signaling converter 106 and the media gateway 110. Further, a second communication device 112 is shown that is coupled to the IP network 130 via a communications network 140. The communication device 112, as described in detail below, can be a destination for an outgoing call initiated by the first communication device 100. In this case, the communication device 112 may be a wired POTS phone (including a cordless phone), a wireless phone (ex. a cellular phone or other mobile communication device, including a telephony-enabled PDA), a VoIP phone, a POTS phone equipped with an analog terminal adaptor (ATA), a softphone (i.e. a computer equipped with telephony software), or a telephony-enabled television unit (ex. a set-top box connected to a television and a remote control). The communications network 140 may comprise a portion of one or more of the PSTN, a wireless network (ex. a cellular network), and a data network (ex. IP network 130).

The call processing system 108, according to some embodiments of the present invention, comprises an IP server that manages SIP message processing and further routes media packets (ex. VoIP packets) over the IP network 130. In some example implementations, the call processing system 108 comprises a soft switch such as a Broadworks Application Server produced by Broadsoft Inc. of Gaithersburg, Md.

Figure 2:
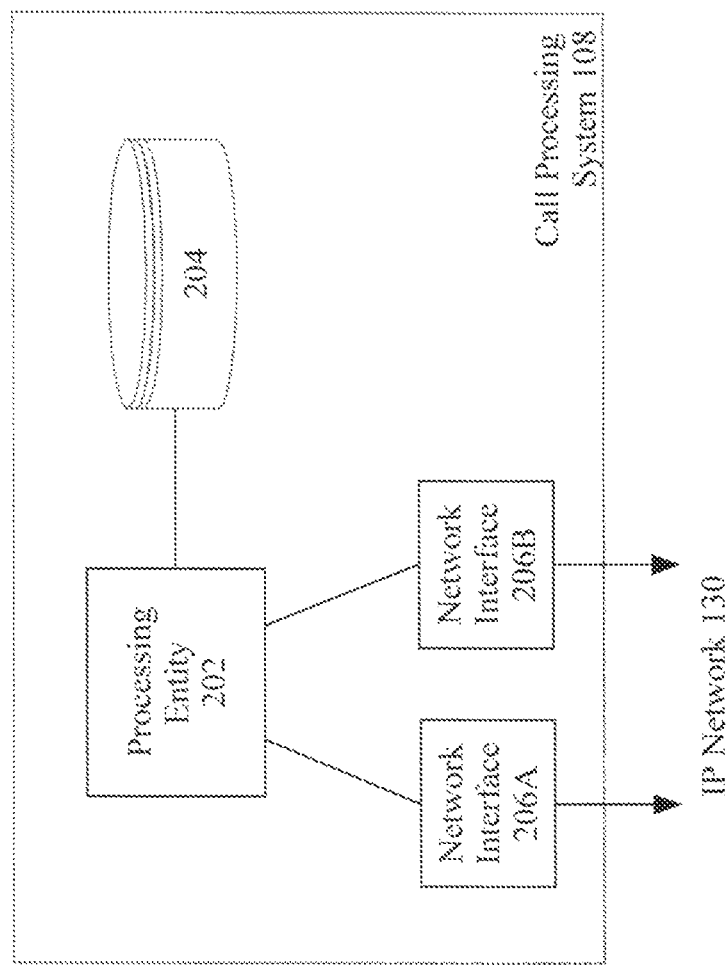
FIG. 2 is a logical block diagram of a call processing system according to an embodiment of the present invention.

FIG. 2 is a logical block diagram of the call processing system 108 according to an embodiment of the present invention. In this sample implementation, the call processing system 108 comprises a processing entity 202 coupled to a database 204. Further, the processing entity 202 is coupled to a plurality of network interfaces, shown in FIG. 2 as network interfaces 206A, 206B, that are each coupled to the IP network 130. The processing entity 202 can receive/transmit SIP messages and media packets from/to various entities within the IP network 130 via the plurality of network interfaces 206A, 206B. The processing entity 202, as will be described herein below in detail for a number of specific implementations, can analyze received SIP messages, conduct look-ups within the database 204 and determine appropriate SIP message responses. Further, the processing entity 202, as will also be described in detail below for a number of specific implementations, can perform numerous media packet processing tasks including but not limited to receiving, analyzing, generating, transmitting and routing media packets. It should be understood that, although depicted as a single element, the processing entity 202 could comprise a plurality of elements that together operate to provide the functionality as described herein below.

The database 204 can store application and customer specific information as will be described herein below. For instance, the database 204 may store call feature related information, customer specific settings for call features, subscription information, customer authentication information, standard call feature message information or other customer or service provider information that may be needed to process SIP messages and/or media packets according to embodiments of the present invention. It should be understood that, although depicted as a single element within the call processing system 108, the database 204 could comprise one or more remote storage elements coupled to the processing entity 202 via one or more of the network interfaces 206A, 206B; a plurality of storage elements within the call processing system 108; or a combination of remote and local storage elements.

Figure 3:
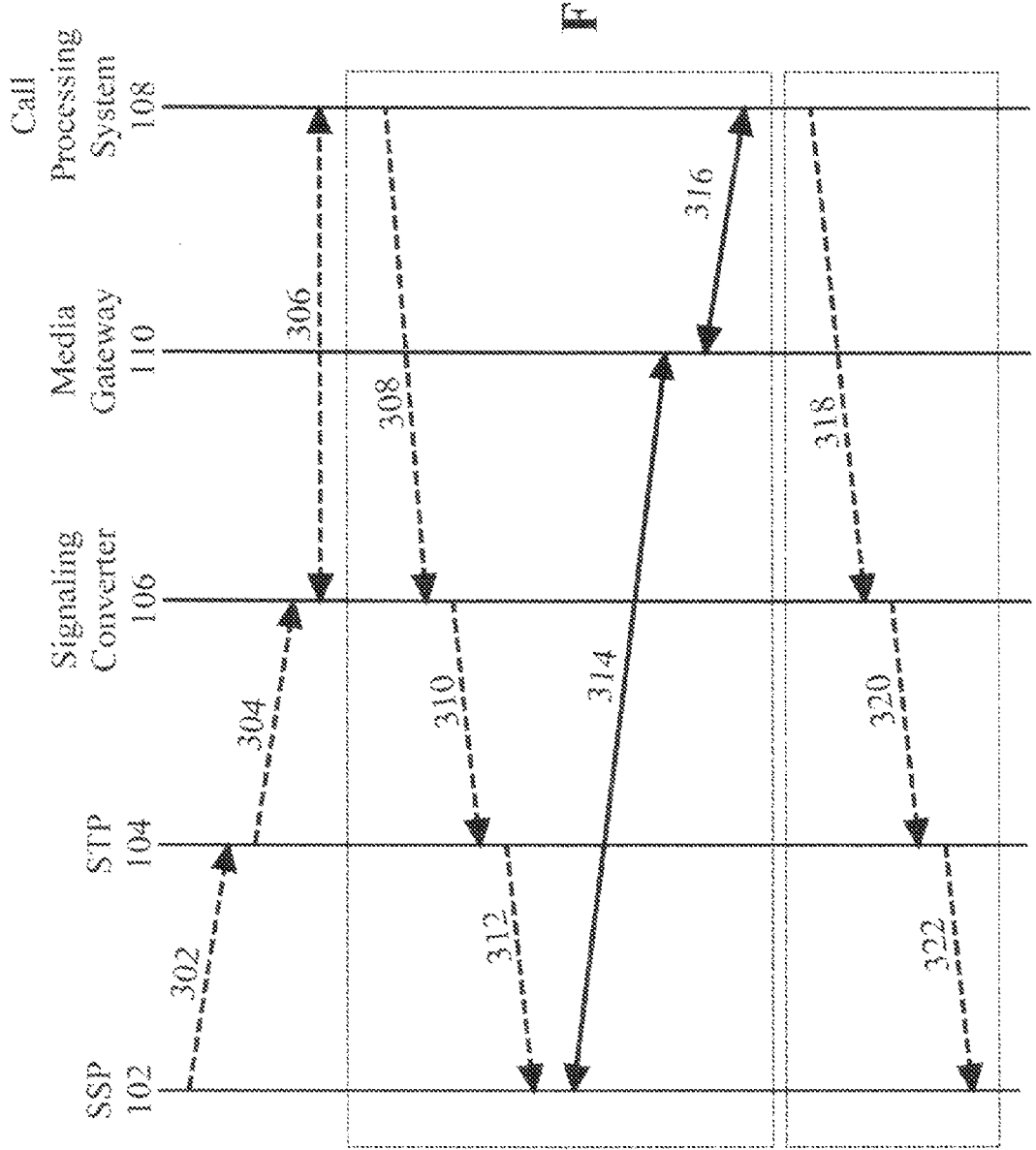
FIG. 3 is a signaling diagram for an outgoing call according to an embodiment of the present invention.
Figure 4:
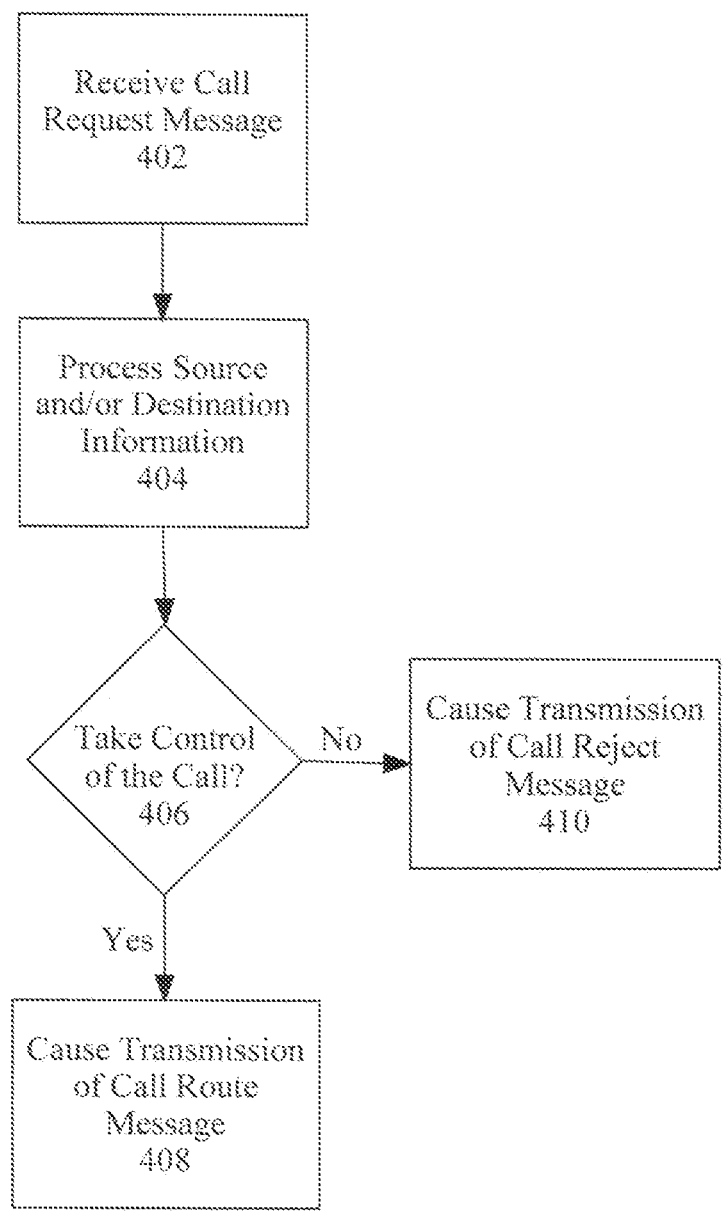
FIG. 4 is a flow chart depicting steps performed by a call processing system according to an embodiment of the present invention during a signaling stage of an outgoing call.

FIGS. 3 and 4 will be used as reference for a description of an outgoing call flow according to an embodiment of the present invention that utilizes the network architecture shown in FIG. 1. The signaling flow for an outgoing call is initiated upon a user activating the communication device 100 and attempting to make an outgoing call to a destination party by transmitting a destination identifier associated with the desired destination party to the SSP 102. For instance, in case of the communication device being a POTS telephone, the user can activate the communication device by taking the device "off hook" and can transmit the destination identifier by pressing Dual-Tone Multi-Frequency (DTMF) keys that together comprise a telephone number associated with the destination party on a keypad of the communication device 100. In other embodiments, the user may activate the communication device 100 and transmit the destination identifier in other manners. For instance, in some embodiments, the communication device has an address book from which the user may select a destination identifier based upon destination name or other associated identifier, this destination identifier being transmitted via DTMF tones or other means to the SSP 102. In other embodiments, the communication device 100 may have a "send" or "talk" selection option which when selected triggers the transmission of the destination identifier to the SSP 102, which in some implementations may comprise a wireless network switch, after the destination identifier has been selected by the user. This transmission of the destination identifier after the "send" or "talk" selection option has been made could also be seen as the activation of the communication device 100.

At this stage, the SSP 102 detects the activation of the communication device 100 and receives the destination identifier, thus receiving an outgoing call initiation from the communication device 100. In the case of the communication device 100 being a POTS telephone, the SSP 102 can have an Off Hook Delay (OHD) trigger associated with the communication device 100 which is detected when the communication device 100 goes "off hook" and a valid telephone number is interpreted from the received DTMF tones. Given that the OHD trigger is enabled, the SSP 102 can be assigned to transmit a TCAP message to the STP 104 for delivery to a specific destination such as the call processing system 108 via the signaling converter 106. The TCAP message, according to embodiments of the present invention, comprises the destination identifier (ex. a telephone number associated with the desired destination party) as well as a source identifier associated with the originator of the outgoing call (ex. a telephone number associated with the communication device 100). The communication device 100 that is used to originate the outgoing call can also be referred to as the source device while a communication device associated with the destination identifier can be referred to as the destination device.

The SSP 102 may have OHD triggers as described assigned to specific subscribers due to call features that the subscriber has enabled. Alternatively, a service provider that manages the SSP 102 may assign the OHD trigger as described to subscribers that it wishes to communicate with. Further, a service provider may assign the OHD trigger as described to all subscribers if specific features or functionality implemented with the call processing system 108 may be necessary for any subscriber. As will be described herein below in detail, the OHD trigger as described is assigned to subscribers that may require call processing from the call processing system 108.

FIG. 3 is a signaling diagram for an outgoing call according to an embodiment of the present invention. In this figure, the SSP 102 transmits the TCAP message described above (including the destination and source identifiers) as message 302 to the STP 104. The STP 104 forwards this TCAP message to the signaling converter 106 as message 304 as a result of routing instructions received from the SSP 102. The signaling converter 106 receives the TCAP message and translates it into a SIP message that comprises a call request message including the destination and source identifiers. The signaling converter 106 subsequently initiates a SIP communication session 306 with the call processing system 108 and transmits the call request message to the call processing system 108.

FIG. 4 is a flow chart depicting steps performed by the call processing system 108, according to an embodiment of the present invention, upon reception of the call request message from the signaling converter 106. As shown, the call processing system 108 receives the call request message at step 402. This call request message may be received at the processing entity 202 via one of the network interfaces 206A, 206B and may be a first message within a SIP session with the signaling converter 106. As described above, the call request message comprises the destination and source information for the initiated outgoing call.

At step 404, the processing entity 202 processes one or both of the source and destination identifiers. A specific example of processing of the source and/or destination identifiers is described in detail herein with reference to FIG. 6. The processing of the source and/or destination identifiers may be performed with information stored within the database 204 or other sources of information external to the call processing system 108. In embodiments of the present invention, specific processing results can occur due to a call feature that a subscriber associated with the source device has subscribed to, call feature settings for specific subscribers and/or the service provider's desire to contact a subscriber.

The processing of the source and/or destination identifiers at step 404 leads to a decision being made by the processing entity 202 at step 406. In particular, the processing entity 202 determines whether to take control of the outgoing call. The processing entity 202 can determine to take control of the outgoing call for many reasons including, but not limited to, enabling a selected audio element to be conveyed to the user of the source device while waiting for the destination device to answer the call and/or other actions as may be desired by the user of the source device or the service provider. Specific examples of decisions for a specific application will be described in more detail herein.

If the processing entity 202 determines to take control of the call at step 406, the processing entity 202, according to embodiments of the present invention, causes the transmission of a call route message at step 408. The call route message can take the form of a number of different SIP messages including, but not limited to, a 200 OK SIP message or another message that would indicate that the outgoing call should be routed to the call processing system 108. The call route message may indicate trunks that the outgoing call should be routed to in order to enable the outgoing call to be routed via the media gateway 110 to the call processing system 108. The call route message may be sent via one of the network interfaces 206A, 206B to the signaling converter 106 as shown as message 308 in FIG. 3. The signaling converter 106 then translates the call route message into a TCAP Call Route message and routes the TCAP Call Route message to the STP 104 as indicated by message 310. The TCAP Call Route message indicates that the outgoing call should be routed to the call processing system 108 via the media gateway 110. The STP 104 routes the TCAP Call Route message to the SSP 102 as shown as message 312. The SSP 102 will subsequently switch the media connection of the outgoing call from the communication device 100 through trunks within the PSTN 120 to the media gateway 110 as shown by media connection 314. The media gateway 110 then initiates a SIP session with call processing system 108 to establish media connection 316. At this point, there is a media connection between the communication device 100, via the SSP 102 and the media gateway 110, to the call processing system 108.

If the processing entity 202 determines not to take control of the call at step 406, the processing entity 202, according to embodiments of the present invention, causes the transmission of a call rejection message at step 410. The call rejection message can take the form of a number of different SIP messages including, but not limited to, a service unavailable message, an error message, an unauthorized call message, a service not implemented message or another message that would indicate rejection of the outgoing call by the processing entity 202. The call rejection message may be sent via one of the network interfaces 206A, 206B to the signaling converter 106 as shown as message 318 in FIG. 3. The signaling converter 106 then translates the call rejection message into a TCAP Continue message and routes the TCAP Continue message to the STP 104 as indicated by message 320. The TCAP Continue message indicates that the outgoing call should be processed as normal by the SSP 102 (i.e. without the use of the call processing system 108). The STP 104 routes the TCAP Continue message to the SSP 102 as shown as message 322. The SSP 102 will subsequently process the outgoing call using the destination identifier as normal using SS7 signaling, potentially requiring a look-up within the SCP 105 or the use of toll switches (not shown) as one skilled in the art would understand.

Figure 5A:
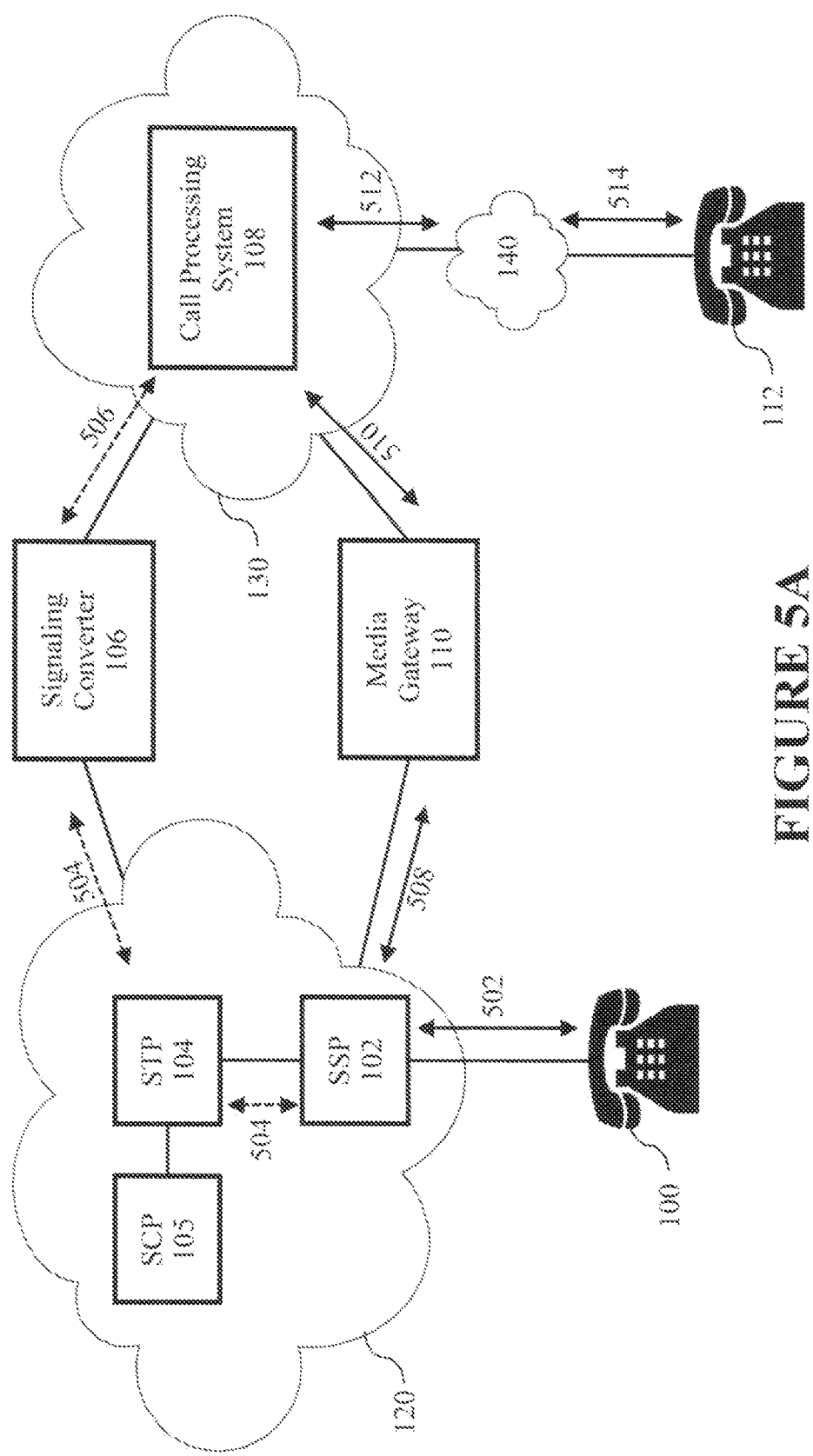
FIGS. 5A and 5B are network architecture block diagrams illustrating two example signaling and media connections potentially resulting from an embodiment of the present invention.
Figure 5B:
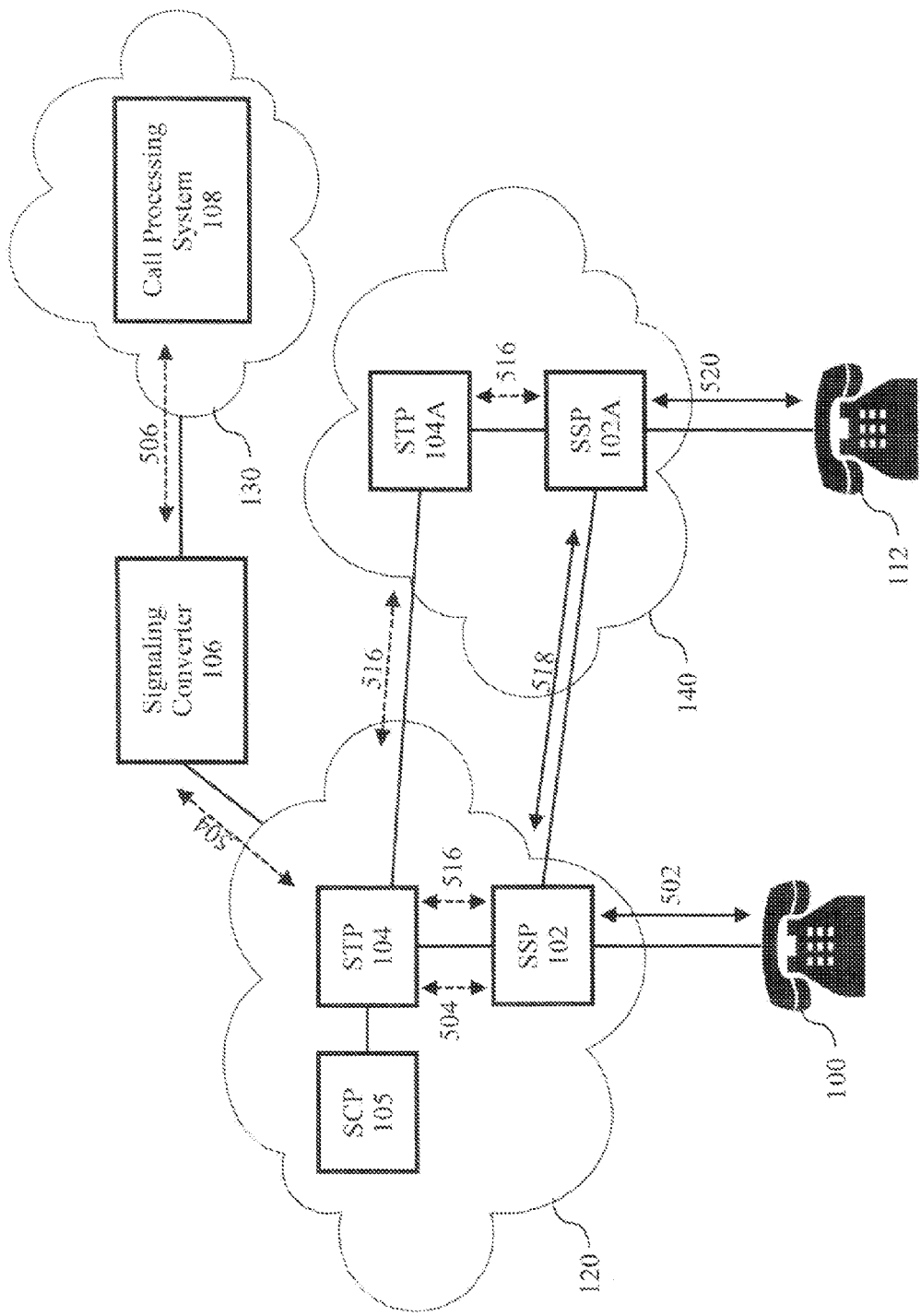

FIGS. 5A and 5B are network architecture block diagrams illustrating two example signaling and media connections potentially resulting from an embodiment of the present invention. FIG. 5A illustrates a similar network architecture to that described above for FIG. 1 and so like components have been identified with the same reference numbers. As shown, a media connection 502 is established between the communication device 100 and the SSP 102. This media connection may be established upon the user of the communication device 100 taking the device off hook and dialing a set of DTMF keys to indicate the desire to initiate an outgoing call to a destination device, in this case communication device 112. As described with reference to FIGS. 3 and 4, the SSP 102 initiates SS7 signaling 504 via the STP 104 to the signaling converter 106 in response to detecting the OHD trigger. The signaling converter 106 subsequently translates the SS7 signaling to SIP messages and communicates the messages with the call processing system 108 over a SIP session 506. In the example of FIG. 5A, the call processing system 108 responds with a call route message that indicates that it wants to control the outgoing call and for the media connection to be connected to the call processing system 108. This message is communicated back to the SSP 102 via the SIP session 506, the signaling converter 106 and the SS7 signaling 504 (as a TCAP Call Route message). In response, the SSP 102 establishes trunks 508 between itself and the media gateway 110 and the media gateway 110 establishes a media connection 510 with the call processing system 108.

The call processing system 108 at this stage then has a media connection with the communication device 100 and knows the source and destination identifiers for the outgoing call. The call processing system 108 may conduct numerous different actions at this point, an example of which will be described in detail for a specific application with reference to FIG. 7. In general, the call processing system 108 may enable a wide variety of functionality after the media connection to the communication device 100 is established including, but not limited to, conveying an audio element to the user of the source device while the user awaits the destination device to accept the call, routing the outgoing call using the destination identifier and/or other actions that a service provider may desire to enable. In the example depicted in FIG. 5A, the call processing system 108, possibly along with other functions, establishes a media connection 512 to the communications network 140 that controls the communication device 112. The communications network 140 may then establish a media connection 514 with the communication device 112, which together with media connections 502, 508, 510 and 512 can allow for the establishment of a complete media connection between the first communication device 100 (the source device) and the second communication device 112 (the destination device).

FIG. 5B illustrates a similar network architecture to that described for FIG. 5A and similar components and signaling are labeled with similar reference numbers. In this example, the call processing system 108 decides not to take control of the outgoing call and therefore responds with a call reject message that indicates that it does not want to control the outgoing call and for the outgoing call to be routed in a normal SS7 signaling manner. This message is communicated back to the SSP 102 via the SIP session 506, the signaling converter 106 and the SS7 signaling 504 (as a TCAP Continue message).

In the example of FIG. 5B, the communication device 112 is a POTS telephone and the communications network 140 is a portion of the PSTN. As shown, the communication device 112 is coupled to a second SSP 102A and the SSP 102A is coupled to a second STP 104A. Through PSTN/SS7 trunks, the SSP 102 is coupled to the second SSP 102A and the STP 104 is coupled to the second STP 104A. When the SSP 102 receives the TCAP Continue message, it proceeds to initiate SS7 signaling 516 via the STP 104 and the second STP 104A to the second SSP 102A. The SS7 signaling 516 enables the establishment of a media connection 518 between the SSP 102 and the second SSP 102A. At this stage, the SSP 102A may enable a media connection 520 between itself and the communication device 112, which together with media connections 502 and 518 can allow for the establishment of a complete media connection between the first communication device 100 (the source device) and the second communication device 112 (the destination device).

Control logic implemented within the processing entity 202 of the call processing system 108 for an example implementation of the present invention are described with reference to FIGS. 6 and 7.

Figure 6:
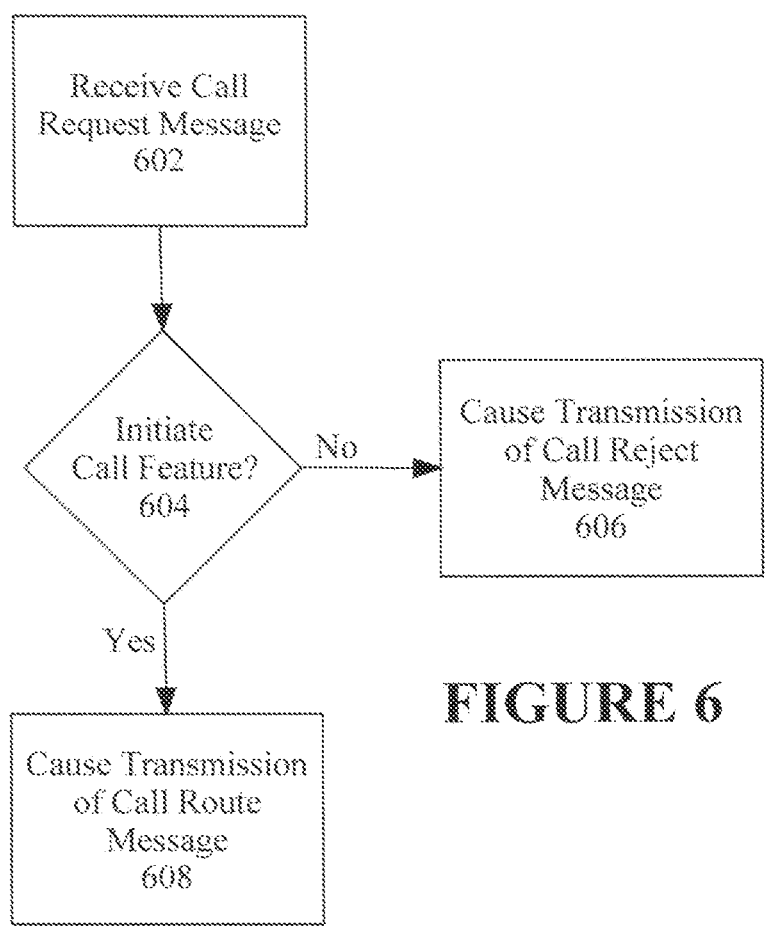
FIG. 6 is a flow chart depicting steps performed by a call processing system during signaling stages of outgoing calls that may require initiation of a call feature according to an example implementation of the present invention.

FIG. 6 is a flow chart depicting steps performed by the processing entity 202 within the call processing system 108 during signaling stages of outgoing calls that may require initiation of a call feature according to an example implementation of the present invention. As shown in FIG. 6, the processing entity 202 receives a call request message at step 602 similar to previously described step 402 of FIG. 4. The call request message comprises source and destination identifiers for the outgoing call. At step 604, the processing entity 202 analyzes the source identifier (and possibly also the destination identifier) to determine whether a call feature should be initiated. This determination can be performed in a number of different manners. In one implementation, the processing entity 202 can perform a look-up within the database 204 or another storage entity external to the call processing system 108 to determine whether the user of the source device is subscribed to a call feature that would require the call processing system 108 to control the outgoing call. In some implementations, the user can set call feature settings with a customer service representative or through online tools. In other implementations, the service provider could subscribe a customer to a call feature or potentially could enable a call feature for all or a defined set of customers.

In the example of FIG. 6, if the processing entity 202 determines that a call feature that requires the call processing system 108 to take control of the outgoing call does not need to be initiated, the processing entity 202 decides not to take control of the outgoing call and causes the transmission of a call reject message at step 606, similar to the step 410 within FIG. 4. In this case, the outgoing call will be established using standard SS7 signaling techniques without control by the call processing system 108.

If the processing entity 202 determines that a call feature that requires the call processing system 108 to take control of the outgoing call does need to be initiated, the processing entity 202 decides to take control of the outgoing call and causes the transmission of a call route message at step 608, similar to the step 408 within FIG. 4. In this case, as is described in detail above, a media connection will be established between the source device and the call processing system 108. This media connection can allow the call processing system 108 to perform a number of call features, such as a call feature to convey an audio element to the source device prior to the establishment of the outgoing call, which will be described in detail with reference to FIG. 7.

Figure 7:
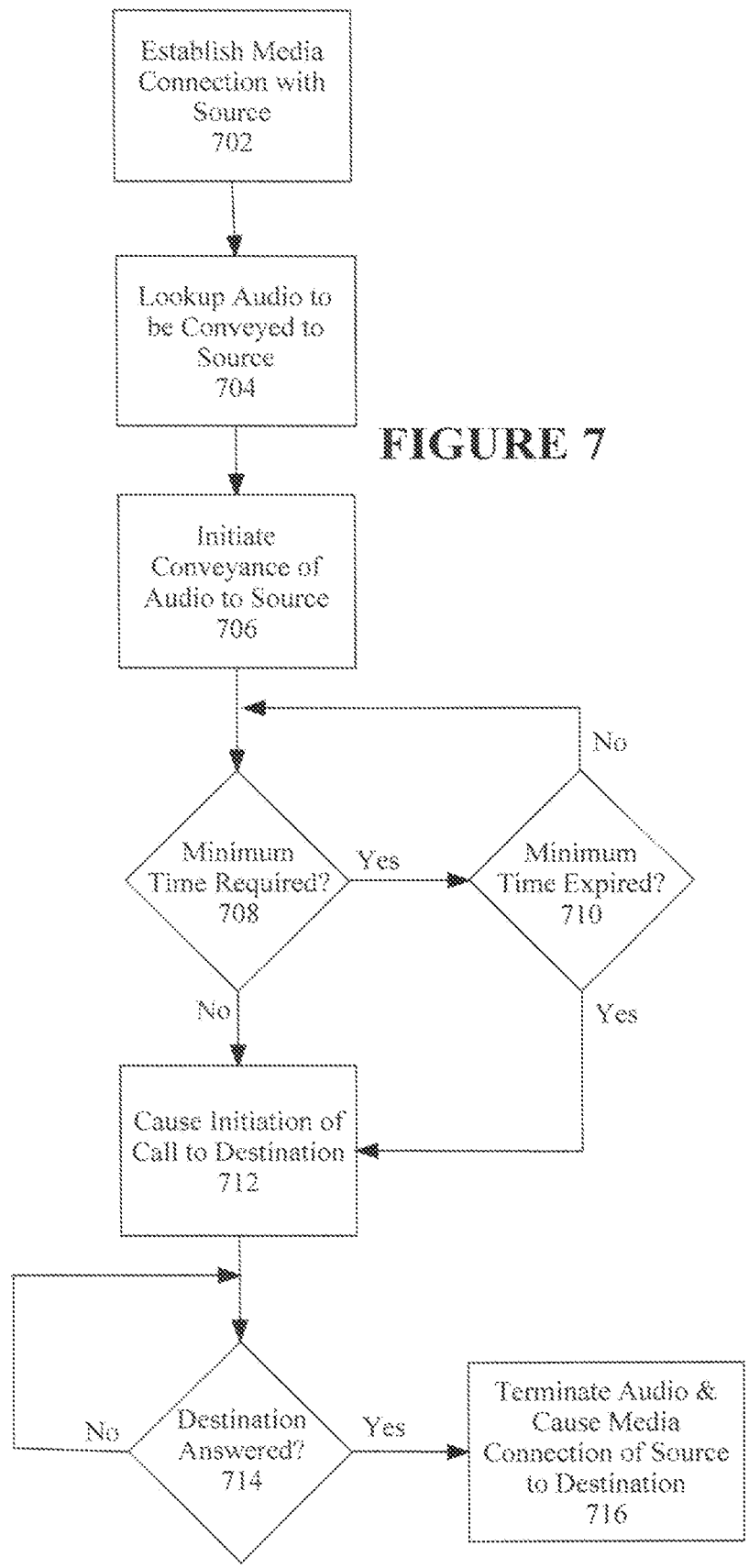
FIG. 7 is a flow chart depicting steps performed by a call processing system after a media connection has been established between a source device of the outgoing call and the call processing system as a result of logic within FIG. 6.

FIG. 7 is a flow chart depicting steps performed by the processing entity 202 within the call processing system 108 after a media connection has been established between the source device and the call processing system 108 as a result of the transmission of the call route message at step 608 of FIG. 6. FIG. 7 is directed to an example implementation of the present invention in which the call feature enables a customized audio element to be conveyed to a user of the source device prior to the establishment of the outgoing call. This customized audio element can be a replacement for the standard ring tone and can provide information, entertainment and/or other benefits.

Within the example implementation of FIG. 7, the processing entity 202 first establishes a media connection with the source device at step 702. Next, at step 704, the processing entity 202 conducts a look-up to determine an audio element to be conveyed to the source device prior to the establishment of the call. The processing entity 202 can perform the look-up on the database 204 and/or another storage entity external to the call processing system 108. In some embodiments, the source identifier can be used as a reference to locate the audio element. In other embodiments, the destination identifier can be used or can be used in combination with the source identifier. In yet further embodiments, neither the source identifier nor the destination identifier is used in the look-up, but instead the audio element is selected based on service provider settings, a random algorithm, a predetermined order, temporal information and/or based upon another selection algorithm.

The audio element can be seen as a replacement for the standard ring tone audio that is heard by the user of the source device while waiting for the destination device to accept the call. The audio element can take many different forms in various implementations of the present invention. In some example implementations, during a provisioning stage, a subscriber of service on the source device may select an audio element from a set of potential audio elements offered by a service provider. In this case, the call processing system 108 or another entity enabled by the service provider may offer a plurality of potential audio elements to the subscriber and subsequently receive selection information from the subscriber, the selection information comprising an indication of at least one of the plurality of audio elements. The selection information may comprise an indication of at least one audio file and/or may comprise an indication of at least one audio stream broadcast on the IP network 130. In other embodiments, the subscriber may provide the call processing system 108 or another entity controlled by the service provider with one or more audio elements that he/she would like to hear while waiting for the destination to accept an outgoing call. The audio element provided by the subscriber may be one or more audio files or a playlist of audio files. For instance, the subscriber may select/provide a particular song (ex "Kashmir" by Led Zeppelin or "Dead Puppies Are So Not Cool" by Samantha and the Cramps), a jingle (ex. seasonal melodies), elevator music, a motivational statement, a voice memo generated by the subscriber or another audio element as desired by the subscriber. In some implementations, the subscriber may select and/or provide a plurality of audio elements and the processing entity 202 may select one of these audio elements based on a random algorithm, a predetermined order within a list or another condition such as temporal information (time of day, week, year, etc.). In this case, the call processing system 108 may associate a subset of potential audio elements to the source identifier and may select within the subset of audio elements based on a random algorithm, predetermined order, temporal information, etc.

In some implementations, the audio element(s) may be stored within the database 204 or another storage entity external to the call processing system 108 and may be referenced using the source identifier. In other implementations, a location identifier is stored within the database 204 or another storage entity external to the call processing system 108 and may be referenced using the source identifier. The location identifier can be used to extract the audio element(s) by the processing entity 202 from network components within the IP network 130. For example, a location identifier could comprise a URL, a lookup reference within an audio element database or another identifier that allows the processing entity 202 to locate the audio element(s) within or outside of the IP network 130.

In some alternative embodiments, the subscriber may select an audio element that is provided by an audio stream source; either transmitted in real time at the time of the outgoing call or a static stream transmitted repetitively. For instance, in some implementations, the subscriber may select a radio broadcast, an audio portion of a television broadcast, a playlist of songs, a service announcement broadcast, a set of one or more advertisement messages, a reading of information (ex. news, weather, sport scores, stock quotes, a magazine, a newspaper, a podcast, a social media update (ex. Facebook, Twitter), etc.) or another audio stream that can be broadcast by an audio stream source and conveyed to a user of the source device at the time of an outgoing call. In some implementations, a location identifier associated with the audio stream source is stored within the database 204 or another storage entity external to the call processing system 108 and may be referenced using the source identifier. The location identifier can be used by the processing entity 202 to locate and connect to an audio stream from the audio stream source. For example, a location identifier could comprise a URL, a lookup reference within a database for the audio stream source or another identifier that allows the processing entity 202 to locate the audio stream source within or outside of the IP network 130.

In other alternative embodiments, the processing entity 202 can generate an audio element that is an audio representation of scheduling information associated with the subscriber of the source device after accessing the scheduling information from a source of scheduling information associated with the subscriber. The source of scheduling information may be an application in which the user has stored scheduling information. The scheduling information could be stored within the database 204 or another storage entity external to the call processing system 108. In some examples, the scheduling information could be stored in a network component (not shown) within the IP network 130 or another data network coupled to the IP network 130. In this case, the network component may run a scheduling application, such as Outlook™ produced by Microsoft Corporation of Redmond, Wash. or Google Calendar produced by Google Inc. of Mountain View, Calif. The processing entity 202 may use the source identifier as a reference within a database, such as the database 204, to access the location and login credential information of the scheduling information. The processing entity 202 may then access the scheduling information from the network component storing the scheduling information through the IP network 130. In another example, the scheduling information could be stored on the source device, for instance, within an application residing on the source device. In this case, the processing entity 202 may communicate with the application on the source device to access the scheduling information associated with the subscriber. The scheduling information, once accessed, can be used by the processing entity 202 to generate an audio element for the source device. In a particular example, the processing entity 202 could enable a text to voice function in order to create an audio element that is an audio representation of one or more events within the scheduling information. The processing entity 202 may use the event(s) that will occur next to create the audio element. For example, if the subscriber has a dentist appointment at 10 am on December 14$^{th}$ and the user of the source device initiates an outgoing call at 9 am on December 14$^{th}$, the processing entity 202 may extract scheduling information related to the dentist appointment from a scheduling program, determine that the dentist appointment is the next event within the scheduling information and generate an audio element such as "Reminder: You have a dentist appointment at 10 am today". The processing entity 202 could also determine the relative time until the event and generate an audio element such as "Reminder: You have a dentist appointment in one hour". In alternative embodiments, a separate processing entity within the IP network 130 could be used to generate the audio element from the scheduling information.

In further alternative embodiments, instead of using the source identifier or along with using the source identifier, the processing entity 202 can use the destination identifier to determine an audio element to convey to the source device. In some implementations, a particular destination identifier may be associated with a particular audio element. For example, a destination identifier may be linked to a reminder message, such as "David's birthday is on December 28$^{th}$". The processing entity 202 may look-up the audio element in this case by using the destination identifier as a reference within the database 204 or another storage entity external to the call processing system 108. In some implementations, a subscriber may enable customized audio elements for particular destination identifiers. In this case, the processing entity may utilize the source identifier to locate information associated with the subscriber within the database 204 or another storage entity external to the call processing system 108 and utilize the destination identifier to locate one or more particular audio element(s) to be conveyed to the source device. For example, a subscriber may set-up one or more memo messages related to a particular individual associated with a destination identifier; link a particular destination identifier to reminder information; link an audio file to a particular destination identifier; or otherwise associate a particular audio element to a destination identifier. In one example, a subscriber may record a voice memo for a particular destination identifier to remind them of fact(s) concerning an individual associated with the destination identifier. In this case, the audio element may comprise "Bill does not like being called William. His wife's name is Dorothy. His son Luke plays hockey and his daughter Emma competes in diving. Bill normally orders 20 boxes of high gloss paper." As described above, the audio element(s) or location information associated with the audio element(s) may be stored within the database 204 or another storage entity external to the call processing system 108.

In other embodiments, the service provider or another third party may select audio elements that are to be conveyed to the source device. In these cases, audio elements may be linked directly to the source identifier, the destination identifier or a combination of the source and destination identifiers; or may not be linked to either of the source and destination identifiers but rather may be a general audio element. In some examples, the audio elements in this case may comprise general information from the service provider (ex. service interruption information, billing information, marketing information, seasonal greeting information, public service information, etc.) or advertising information from third parties as selected by the service provider or by a third party. The advertisements, in some implementations, may be linked to information known by the service provider concerning the subscriber and/or an entity associated with the destination identifier. As described above, the audio element(s) or location information associated with the audio element(s) may be stored within the database 204 or another storage entity external to the call processing system 108.

As shown in FIG. 7, once the processing entity 202 has looked up the audio element to be conveyed to the source device at step 704, the processing entity 202 initiates the conveyance of the audio element to the source device at step 706. The conveyance of the audio element may comprise playing the audio element over the media connection with the source device. In alternative embodiments, the processing entity 202 may alternatively connect an audio stream source to the media connection with the source device. It should be understood that the means for conveyance of the audio element to the source device may be determined at least partially upon the audio element that is to be conveyed. The conveyance of an audio element to a source device for two example scenarios will be described with reference to FIGS. 10A and 10B.

In some embodiments of the present invention, other media elements could be conveyed to the source device along with or instead of an audio element. For example, if the source device can support a display capable of projecting visual data such as video, images and/or text (ex. multimodal phones, smart phones, computer screen associated with the source device etc.), the processing entity 202 could look-up other media elements such as video, images or text information and transmit these other media elements to the source device. In this case, a user of the source device may be able to view video, images and/or text information on a display of the source device prior to (and possibly during) the call being established between the source and destination devices. Similar to the various embodiments described, the other media elements could include information selected by a subscriber associated with the source device, information related to an entity associated with the destination identifier (ex. memos related to the entity, images/videos of the entity, etc.), information selected by a service provider or third party (ex. alert, advertisement, account information, etc.) or other data that can be visually displayed on a screen at the source device.

In some embodiments of the present invention, the processing entity 202 determines whether the audio element being conveyed has a minimum time that is required at step 708. A minimum time may be required or desired for the conveying of an audio element if particular information is required or desired to be conveyed to the user of the source device prior to the outgoing call being established with the destination device. This may be the case for audio elements such as voice memos, reminders, or other audio elements that convey information. If a minimum time is required at step 708, the processing entity 202 will wait the required minimum time at step 710. The processing entity 202 may be provided with minimum time information along with the audio element or may receive an indication that signifies that the full audio element needs to be played. It should be understood that in some embodiments, no minimum time requirement is needed and steps 708 and 710 are not implemented by the processing entity 202.

If the minimum time is not required at step 708 or if the minimum time has expired at step 710, the processing entity 202 causes the initiation of a call to the destination device using the destination identifier at step 712. In some embodiments, the initiation of a call to the destination device occurs only after the minimum time has expired at step 710 though, in other embodiments, no such delay may occur. The initiation of the call can be performed in many manners and will depend upon the network that the destination device is connected and the protocols the network utilizes.

After causing initiation of the call to the destination device at step 712, the processing entity waits for the destination device to answer the call at step 714. During this waiting period, when a traditional "ring tone" audio would normally be provided to the source device, the processing entity 202, according to embodiments of the present invention, continues to convey the audio element(s) to the source device. If the audio element ends during this waiting period, the processing entity 202 may either convey the audio element an additional time, convey another audio element (ex. another song, ring tone) or stop conveying audio to the source device.

Once the destination device answers the call, the processing entity 202, as depicted in step 716, proceeds to terminate the conveying of the audio element and cause a media connection to be established between the source device and the desired destination device. The terminating conveying of the audio element may be prior to or substantially simultaneous with the establishment of the media connection between the source and destination devices. This media connection can be established in a number of manners. In one example, the processing entity 202 causes the establishment of a media connection between the call processing system 108 and the destination device and subsequently bridges it with the already established media connection between the source device and the call processing system 108. Other techniques for the call processing system 108 to connect the source and destination devices should be understood.

Although the description of embodiments above are directed to implementations in which the source device (communication device 100 of FIG. 1) is coupled to the SSP 102 and the SSP 102 utilizes SS7 signaling to control outgoing calls from the source device, it should be understood that the call feature described with reference to FIG. 7 could be applied to other implementations. For instance, in embodiments of the present invention, the source device may comprise a VoIP enabled device controlled by SIP signaling and outgoing calls from the source device may be controlled by a call processing system similar to the call processing system 108 of FIG. 1. An example network architecture according to this embodiment is described with reference to FIG. 8.

Figure 8:
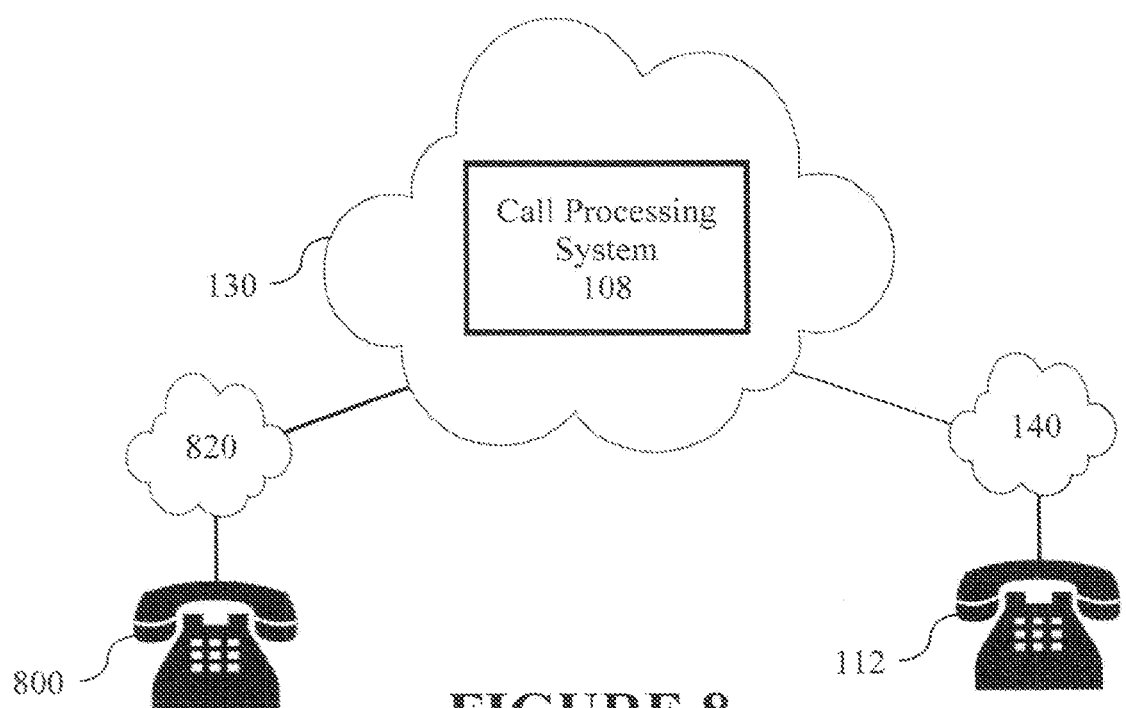
FIG. 8 is a network architecture block diagram according to an alternative embodiment of the present invention.

FIG. 8 depicts a network architecture block diagram similar to that depicted in FIG. 1 with like components being provided with like reference numerals. Within FIG. 8, the communication device 100 has been replaced with a communication device 800 and the PSTN 120 has been replaced with a communication network 820. The communication device 800 comprises any one of a VoIP phone (wireline or wireless), a POTS phone equipped with an analog terminal adaptor (ATA), a softphone (i.e. a computer equipped with telephony software), or a telephony-enabled television unit (ex. a set-top box connected to a television and a remote control). The communications network 820 may comprise a portion of one or more data networks (ex. the Internet, IP network 130, a private IP network) and/or a wireless network (ex. a cellular network). In this architecture, the communication device 800 may initiate outgoing telephony calls via the communication network 820 using a signaling protocol such as SIP.

In one particular example implementation, the communication device 800 may have its incoming/outgoing calls controlled by call processing system 108. As described, the call processing system 108 may comprise one or more servers that enable soft switch functionality for VoIP calls. In this example, when the communication device 800 initiates an outgoing call, the device 800 may send a call request message in the form of a SIP invite to the call processing system 108 via the network 820 and the network 130. The SIP invite may include a source identifier that identifies the communication device 800 (ex. telephone number, IP address, URL, SIP URI, MAC address etc) and a destination identifier that identifies a desired destination device (ex. potentially communication device 112 within FIG. 8). The call processing system 108 can then manage the establishment of a media connection between the communication device 800 and its desired destination device. As well, the call processing system 108 can implement call features, including a call feature similar to that described above with reference to FIG. 7 for conveying an audio element to the source device prior to establishment of the outgoing call. In particular, upon receiving a SIP invite from the communication device 800, the call processing system 108 can establish a media connection with the communication device 800 similar to that described in step 702 within FIG. 7. The remaining steps of the process depicted in FIG. 7 can then proceed in a similar manner.

FIG. 9 is a logical diagram of a sample database for use with the call feature of FIG. 7 according to an example implementation of the present invention. As depicted, the database of FIG. 9 is shown as comprising the database 204 of FIG. 2. It should be understood that the database of FIG. 9 could comprise another storage entity external to the call processing system 108 and may comprise a plurality of entities that together operate as a database.

As shown in FIG. 9, the database 204 comprises a plurality of data entries $902_1, 902_2, 902_3, 902_4 \ldots 902_N$, in this case, totaling N entries. Each of the data entries $902_1, 902_2, 902_3, 902_4 \ldots 902_N$ comprises source information 904 that comprises one or more source identifiers that uniquely identify the entry and allows for a look-up by the processing entity 202. The source identifiers 904 may comprise any uniquely addressable identifier including, but not limited to, a telephone number, an IP address, a URL, a SIP URI, MAC address etc. Each entry may be linked to a single subscriber, a plurality of subscribers or a group of subscribers (such as a corporation, family, team etc.) and may comprise one or more source identifiers within the source information 904. A plurality of source identifiers within the source information 904 may be desired in the case that a subscriber has a plurality of telephonic devices, each of which having a corresponding identifier.

Further depicted in FIG. 9, each data entry $902_1$, $902_2$, $902_3$, $902_4$ . . . $902_N$ comprises an indication of one or more audio elements 906. As described above, audio elements may comprise a variety of different forms. For instance, in some implementations, the audio element may comprise a particular song, a jingle, elevator music, a motivational statement, a voice memo generated by the subscriber or another audio element as desired by the subscriber. The indication of the audio elements 906 may comprise the actual audio element or a location identifier that identifies a storage location for the audio element, the location identifier in some embodiments comprising a URL, a lookup reference within an audio element database or another identifier that allows the processing entity 202 to locate the audio element(s) within or outside of the IP network 130. Further, the audio element may comprise an audio stream provided by an audio stream source; either provided in an audio stream in real time at the time of the outgoing call or a static repetitive stream. For example, the audio stream may comprise a radio broadcast, an audio portion of a television broadcast, a playlist of songs, a service announcement broadcast; a set of one or more advertisement messages, a reading of information (ex. news, weather, sport scores, stock quotes, a magazine, a newspaper, a podcast, a social media update (ex. Facebook, Twitter), etc.) or another audio stream that can be broadcast by an audio stream source and conveyed to a user of the source device at the time of an outgoing call.

Yet further, the audio element may comprise scheduling information associated to a user of the source device or related to information that is known concerning a user of the destination device. Even further, the audio element may comprise general information from the service provider (ex. service interruption information, billing information, marketing information, seasonal greeting information, public service information, etc.), advertising information from third parties as selected by the service provider or by a third party, one or more memo messages related to a particular individual linked to a particular destination identifier; reminder information linked to a particular destination identifier; a particular song, jingle, elevator music or motivation message linked to a particular destination identifier; or otherwise a particular audio element linked to a particular destination identifier.

Yet further, the data entries $902_1$, $902_2$, $902_3$, $902_4$ . . . $902_N$ of FIG. 9 may comprise condition information 908, the condition information 908 dictating, in some data entries, conditions that need to apply in order for particular audio elements 906 to be conveyed to a source device. The condition information 908 may comprise a selection algorithm (ex. random, sequential, playlist predetermined order), a temporal condition (ex. time of day, week, year, etc.), a condition related to one or more particular destination identifiers, a condition related to information within a scheduling program or any other conditions as may be set by a subscriber, a service provider or a third party.

In the particular example implementation shown in FIG. 9, data entry $902_1$ contains a source identifier 416-888-1234 as source information 904. This source identifier is a telephone number associated to a subscriber to the call feature. The data entry $902_1$ further contains a song "Kashmir" by Led Zeppelin as an indication of an audio element 906. This indication may comprise an actual file with the song (ex. MP3) or may comprise location information for locating the song within a storage entity. In the case of data entry $902_1$, there are no conditions within the condition information 908 and therefore this song is selected to be played to a source device associated with the particular source identifier for all outgoing calls.

As shown, data entry $902_2$ contains a source identifier 613-777-4321 as source information 904. This source identifier is a telephone number associated to a subscriber to the call feature. The data entry data entry $902_2$ further contains a URL for an MP3 playlist as an indication of an audio element 906. This indication provides location information for locating an MP3 playlist on the Internet. In the case of data entry $902_2$, there is one condition within the condition information 908, that is that songs within the MP3 playlist be played with a random selection order during outgoing calls.

Within FIG. 9, data entry $902_3$ contains source identifiers 613-777-2222 and 613-333-2222 as source information 904. These source identifiers are telephone numbers associated to a single subscriber to the call feature and so are grouped together in the data entry $902_3$. The data entry $902_3$ further contains a link to an Economist magazine blog, a link to a CBC Radio 3 real-time broadcast and a Jazz compilation as indications of audio elements 906. These indications provide audio elements (possibly for the blog or the Jazz compilation) or location information for locating the audio elements on an audio element storage entity and/or the Internet. In the case of data entry $902_3$, there are conditions within the condition information 908 that apply for each of the indications of audio elements 906. In this case, the Economist magazine blog is to be conveyed if an outgoing call occurs in the morning, the CBC Radio 3 broadcast is to be conveyed if an outgoing call occurs in the afternoon and the Jazz compilation is to be conveyed if an outgoing call occurs in the evening.

Data entry $902_4$ within the database 204 of FIG. 9 contains a source identifier 24.114.111 as source information 904. This source identifier is an IP address associated to a subscriber to the call feature. The data entry $902_4$ further contains a memo to Fred (an individual associated with a particular destination identifier) and a birthday reminder element as indications of audio elements 906. The memo to Fred audio element may be a prerecorded memo containing information related to an individual named Fred. The birthday reminder audio element may be an indication to look-up scheduling information and determine if an individual associated with the destination identifier for an outgoing call has a birthday event within a short period of time. In the case of data entry $902_4$, there are conditions within the condition information 908 that apply for each of the indications of audio elements 906. In this case, the memo to Fred is to be conveyed if the outgoing call is directed to a destination identifier associated with an individual named Fred. The birthday reminder element is to be conveyed if it is detected that an individual associated with the destination identifier of the outgoing call has a birthday within 2 days of the outgoing call.

Finally, data entry $902_N$ contains a source identifier 6139992345 @bell.ca as source information 904. This source identifier is a SIP URI associated to a subscriber to the call feature. The data entry $902_N$ further contains a link to a weather network as an indication of an audio element 906. This indication provides weather information which can be converted from text to speech to generate an audio element or may be conveyed to the source device in text form via a display on the source device. In the case of data entry $902_N$, the condition within the condition information 908 for the audio element is to provide weather information related to the destination identifier's location as may be dictated by a telephone area code within the destination identifier of the outgoing call.

Although depicted for particular data entries within the database 204 of FIG. 9, it should be understood that the data entries $902_1$, $902_2$, $902_3$, $902_4$ ... $902_N$ depicted are only example implementations. Other subscribers may select alternative audio elements and apply a variety of different conditions for conveyance of the audio elements.

In some embodiments of the present invention, as described above, other media elements could be conveyed to the source device along with or instead of an audio element. In these cases, the other media elements may be stored within the data entries $902_1$, $902_2$, $902_3$, $902_4$ ... $902_N$ along with or instead of the indications of audio elements 906. In some examples, the other media elements are stored with conveyance information, the conveyance information indicating an appropriate means for conveying the media element to the user of the source device.

Further, although not depicted in FIG. 9, condition information 908 for a particular data entry may comprise a minimum time for the audio element to be conveyed as described in detail above with reference to FIG. 7.

Figure 10B:
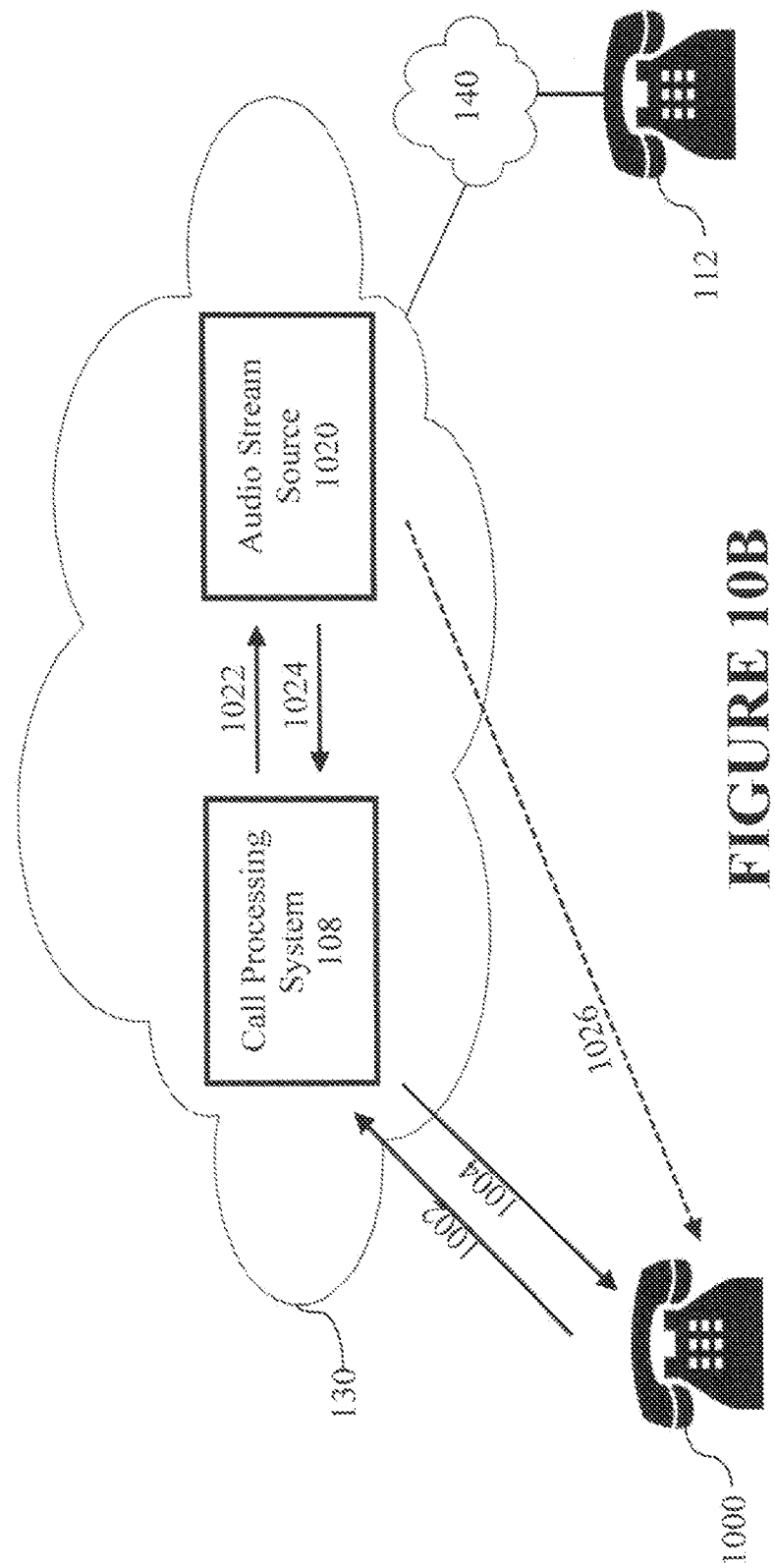

FIGS. 10A and 10B are simplified network block diagrams which illustrate the process of conveying an audio element (step 706 within FIG. 7) to a source device for two example scenarios using the call processing system 108. In the scenario of FIG. 10A, the audio element is an audio file stored within a content database, the content database being local to the call processing system 108 or alternatively being a network component within the IP network 130 or another data network coupled to the IP network 130. In the scenario of FIG. 10B, the audio element is an audio stream transmitted by an audio stream source, which may be controlled by the same or a different entity from the operator of the call processing system 108.

In both scenarios, a source device 1000 is coupled to the IP network 130 that comprises the call processing system 108. In operation, the source device 1000 transmits a call request message 1002 to the call processing system 108. The call request message 1002 may be transmitted to the call processing system 108 similar to previously described with reference to FIG. 3 in the case that the source device 1000 is a POTS-enabled device that utilizes SS7 signaling. The call request message 1002 may be transmitted as a SIP invite as described with reference to FIG. 8 in the case that the source device 1000 is a VoIP-enabled device that utilizes SIP. Upon reception of the call request message 1002, the call processing system 108 may establish a media connection 1004 with the source device 1000 similar to step 702 of FIG. 7 and perform a look-up to determine an audio element to convey to the source device as described for step 704 of FIG. 7.

As shown in FIG. 10A, a content database 1010 is further coupled to call processing system 108 within the IP network 130, the content database 1010 comprising a plurality of audio files that may include, but are not limited to, songs, jingles, elevator music, motivational statements, marketing messages, advertisements, service announcements and voice memos. In the example scenario of FIG. 10A, the audio element to be conveyed to the source device 1000 is one or more audio file(s) stored within the content database 1010. The audio file(s) may have been selected by or provided by a subscriber associated with the source device 1000 during a prior provisioning stage or may be selected by or provided by another entity such as the service provider that operates the call processing system 108 or a third party entity (ex. advertiser, government, etc.) enabled by the service provider or the subscriber. In the case of the subscriber selecting one or more audio file(s) during a prior provisioning stage, in some implementations, the subscriber may select the audio file(s) via a web-based interface with the call processing system 108 or with the content database 1010 or through another communication interface (ex. web application, telephone, application on a telephone, etc.) with the service provider that operates the call processing system 108 or another entity enabled by the service provider. In this case, the call processing system 108 or another entity enabled by the service provider may offer a plurality of potential audio files to the subscriber and subsequently receive selection information from the subscriber, the selection information comprising an indication of at least one of the plurality of audio files. In an alternative implementation, the service provider that operates the call processing system 108 may determine subscriber selected audio file(s) by accessing web-based and/or device based audio file(s) and/or playlist(s) previously selected by the subscriber for other purposes (ex. playlists within iTunes on a computer/telephone or a web-based music website), presuming that the service provider has been given proper permission to access such information.

In the example scenario of FIG. 10A, upon looking up the audio element to be conveyed to the source device, the call processing system 108 transmits an audio file request 1006 to the content database 1010. In some implementations, the content database 1010 is incorporated within the call processing system 108 and therefore the audio file request 1006 would be transmitted between the processing entity 202 of the call processing system 108 and the content database 1010. In other implementations, the content database 1010 is an external component within the IP network 130 or another data network coupled to the IP network 130 and the audio file request 1006 is transmitted via IP packets to the content database 1010. In some cases, the content database 1010 may be incorporated within the database 204, the combined database being either implemented within the call processing system 108 or external within the IP network 130. Upon receiving the audio file request 1006, the content database 1010 accesses the requested audio file(s), establishes a media connection 1008 with the call processing system 108 and plays the audio file(s) over the media connection 1008, the call processing system 108 bridging the media connection 1008 with the media connection 1004 established with the source device 1000 in order to convey the audio file(s) to the source device 1000. In an alternative implementation, the content database 1010 may establish a direct media connection 1012 (shown with a dashed line in FIG. 10A) with the source device 1000 if the call processing system 108 provides an identifier of the source device 1000 within the audio file request 1006. In this implementation, the content database 1010 can convey the audio files(s) to the source device 1000 via the media connection 1012 without the call processing system 108 bridging the media connections. In this case, the call processing system 108 may send a termination command to the content database 1010 or to the source device 1000 to terminate the media connection 1012 on which the audio file(s) are being conveyed during step 716 of the process of FIG. 7. In yet another alternative implementation, rather than play the audio file(s), the content database 1010 may transfer the audio file(s) to the call processing system 108 or the source device 1000 and the actual playing of the audio file(s) may be performed by the call processing system 108 or the source device 1000. In these cases, a sufficiently high bandwidth connection is required to transfer the audio file(s) such that the file transfer does not noticeably delay the playing of the audio file(s) to a user of the source device 1000.

FIG. 10B depicts a simplified logical network block diagram similar to that shown in FIG. 10A and like components have been identified with the same reference numbers. Within FIG. 10B, the content database 1010 has been removed and instead an audio stream source 1020 is included. The audio stream source 1020 is depicted in FIG. 10B within the IP network 130, though the audio stream source 1020 may be within a different data network coupled to the IP network 130. The audio stream source 1020 may comprise a server or other network component (ex. networked computer, etc.) that is operable to transmit streaming audio content to network components within the IP network 130 or other connected networks. The network components receiving the streamed audio content may include the call processing system 108 and/or the source device 1000 if the source device 1000 is enabled to receive data over the IP network 130 or another data network coupled to the IP network 130. In some particular implementations, the audio stream source 1020 comprises a web server that is operable to continuously stream a radio broadcast, an audio portion of a television broadcast, a playlist of songs, a service announcement broadcast, a set of one or more advertisement messages, a reading of information (ex. news, weather, sport scores, stock quotes, a magazine, a newspaper, a podcast, a social media update (ex. Facebook, Twitter), etc.) or other audio content as one may desire to stream on a data network. In the example scenario of FIG. 10B, the audio element to be conveyed to the source device 1000 is an audio stream that is transmitted by the audio stream source 1020. The audio stream to be conveyed to the source device 1000 may have been selected by a subscriber associated with the source device 1000 during a prior provisioning stage or may be selected by another entity such as the service provider that operates the call processing system 108 or a third party entity (ex. advertiser, government, etc.) enabled by the service provider or the subscriber. Similar to that described above for the scenario of FIG. 10A, in the case of the subscriber selecting an audio stream during a prior provisioning stage, in some implementations, the subscriber may select the audio stream via a web-based interface with the call processing system 108 or with the audio stream source 1020 or through another communication interface (ex. web application, telephone, application on a telephone, etc.) with the service provider that operates the call processing system 108 or another entity enabled by the service provider. In this case, the call processing system 108 or another entity enabled by the service provider may offer a plurality of potential audio streams to the subscriber and subsequently receive selection information from the subscriber, the selection information comprising an indication of at least one of the plurality of audio streams.

In the example scenario of FIG. 10B, upon looking up the audio element to be conveyed to the source device, the call processing system 108 transmits an audio stream request 1022 to the audio stream source 1020. The audio stream request 1022 may comprise IP packets that request a media connection 1024 to be established between the audio stream source 1020 and the call processing system 108. In some cases, the audio stream request 1022 may comprise a URL of a particular audio stream or another identifier that is associated with a particular audio stream. For example, the audio stream request 1022 may comprise a URL associated with an online radio broadcast of "CBC Radio 3". Upon receiving the audio stream request 1022, the audio stream source 1020 establishes a media connection 1024 with the call processing system 108 and initiates transmitting of the selected audio stream over the media connection 1024, the call processing system 108 bridging the media connection 1024 with the media connection 1004 established with the source device 1000 in order to convey the audio stream to the source device 1000. In an alternative implementation, the audio stream source 1020 may establish a direct media connection 1026 (shown as a dashed line in FIG. 10B) with the source device 1000 if the call processing system 108 provides an identifier of the source device 1000 within the audio stream request 1022. In this implementation, the audio stream source 1020 can convey the audio stream to the source device 1000 via the media connection 1026 without the call processing system 108 bridging the media connections. In this case, the call processing system 108 may send a termination command to the audio stream source 1020 or to the source device 1000 to terminate the media connection 1026 on which the audio stream is being conveyed during step 716 of the process of FIG. 7.

As described previously, in some embodiments of the present invention, other media elements could be conveyed to the source device along with or instead of an audio element. In FIG. 10A, other elements could be stored within the content database 1010 and these additional media elements such as video, images and/or text could be conveyed to the source device 1000 along with, or instead of, the audio file(s). Further, in FIG. 10B, the audio stream source 1020 could be a media stream source that is operable to transmit other media elements such as video, images and/or text along with, or instead of, the audio stream to the source device 1000. In both of these cases, the source device 1000 would require a data connection capable of receiving the media elements and a screen capable of displaying visual data.

Within the above description, the call processing system 108 has been described as a single system that performs signaling functionality and performs functionality after a media connection is established between it and the source device. In alternative embodiments, the system that performs the signaling functionality as described herein may be distinct to the system that performs the functionality described herein after the media connection is established with the source device. In this embodiment, the two systems may communicate with each other or may not. Further, the two systems may be operated by two distinct corporate entities in some embodiments.

The embodiments of the present invention described above are directed to implementations in which the call processing system 108 conveys an audio element prior to the call being established with the destination device to replace the traditional ring tone that a user of the source device would normally hear. In alternative embodiments of the present invention as will be described with reference to FIGS. 11, 12 and 13, the source device used to initiate the call may also be used to look-up and convey the audio element to a user prior to the call being established with the destination device. In this alternative, the source device either may not receive a traditional ring tone from a network element such as the SSP 102 or the call processing system 108 or may ignore the traditional ring tone that it receives and replace it with an alternative audio element.

Figure 11:
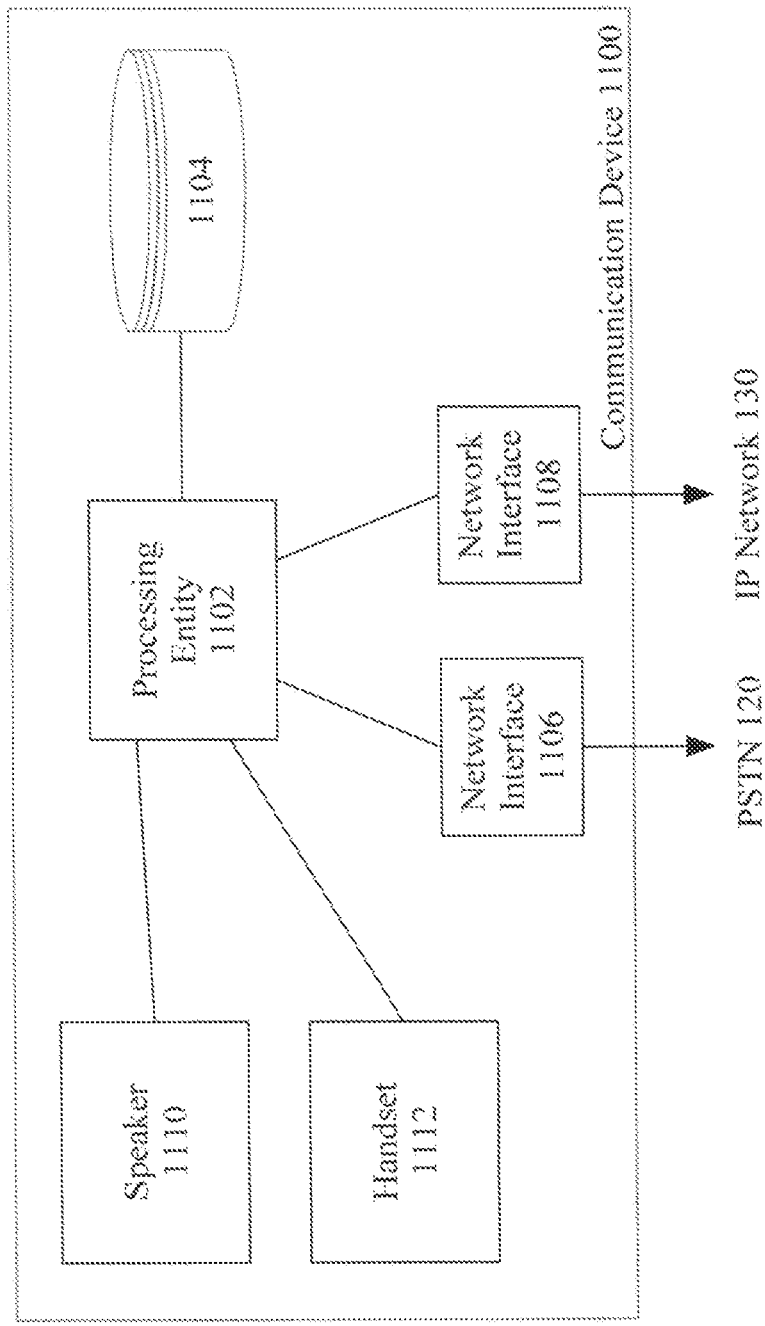
FIG. 11 is a logical block diagram of a communication device according to an embodiment of the present invention.

FIG. 11 is a logical block diagram of a communication device 1100 according to an example implementation of the present invention that may be used as a source device during an outgoing call that conveys an audio element to a user as a replacement to the traditional ring tone. In this implementation, the communication device 1100 comprises a processing entity 1102 coupled to a database 1104, a speaker 1110 and a handset 1112. In some embodiments, the communication device 1100 may comprise only one of the speaker 1110 and the handset 1112. Further, the communication device 1100 of FIG. 11 comprises first and second network interfaces 1106, 1108 coupled to the processing entity 1102, though in various embodiments of the present invention, the communication device 1100 may comprise only the first network interface 1106, only the second network interface 1108 or both of the network interfaces 1106,1108. The first network interface 1106 is operable to be coupled to the PSTN 120 or another network that enables POTS telephone to make/receive telephone calls. The second network interface 1108 is operable to be coupled to a data network such as the IP network 130 and enables the processing entity 1102 to make/receive VoIP telephone calls and communicate with network components within a data network such as the IP network 130.

The processing entity 1102, in various implementations in which the communication device 1100 includes the first network interface 1106, is operable to initiate an outgoing call over the PSTN 120, conduct look-ups within the database 1104 to locate an audio element and convey the located audio element to a user of the communication device 1100 prior to the outgoing call being established as a replacement to the traditional ring tone that may be received at the communication device 1100 from the PSTN 120. The processing entity 1102, in various implementations in which the communication device 1100 includes the second network interface 1108, is operable to initiate an outgoing call over the IP network 130, conduct look-ups within the database 1104 to locate an audio element and convey the located audio element to a user of the communication device 1100 prior to the outgoing call being established as a replacement to the traditional ring tone that may be normally conveyed to a user of the communication device 1100. The processing entity 1102, in the case that the communication device 1100 comprises the second network interface 1108, may further be operable to receive/transmit SIP messages and media packets from/to various entities within the IP network 130 via the second network interface 1108 and may be operable to perform numerous media packet processing tasks including but not limited to receiving, analyzing, generating, transmitting and routing media packets. It should be understood that, although depicted as a single element, the processing entity 1102 may comprise a plurality of elements that together operate to provide the functionality as described herein below.

The database 1104 of FIG. 11 may be similar to the database 204 described with reference to FIG. 2. In particular, in specific implementations, the database 1104 may comprise information concerning audio elements that are to be conveyed to a user of the communication device 1100 and any conditions that might apply to conveyance of such audio elements. In essence, in some implementations, the database 1104 may comprise entries similar to that described with reference to FIG. 9 but with no need to include a column for the source identifier. In some implementations as will be described, the database 1104 may further comprise audio file(s) that are to be conveyed to a user of the communication device 1100. In other implementations, only a location identifier for the audio element to be conveyed is stored within the database 1104. It should be understood that, although depicted as a single element within the communication device 1100, the database 1104 could comprise a plurality of storage elements and, in the case that the communication device 1100 comprises the second network interface 1108, the database 1104 may comprise one or more remote storage elements coupled to the processing entity 1102 via the second network interface 1108 or a combination of remote and local storage elements.

Figure 12:
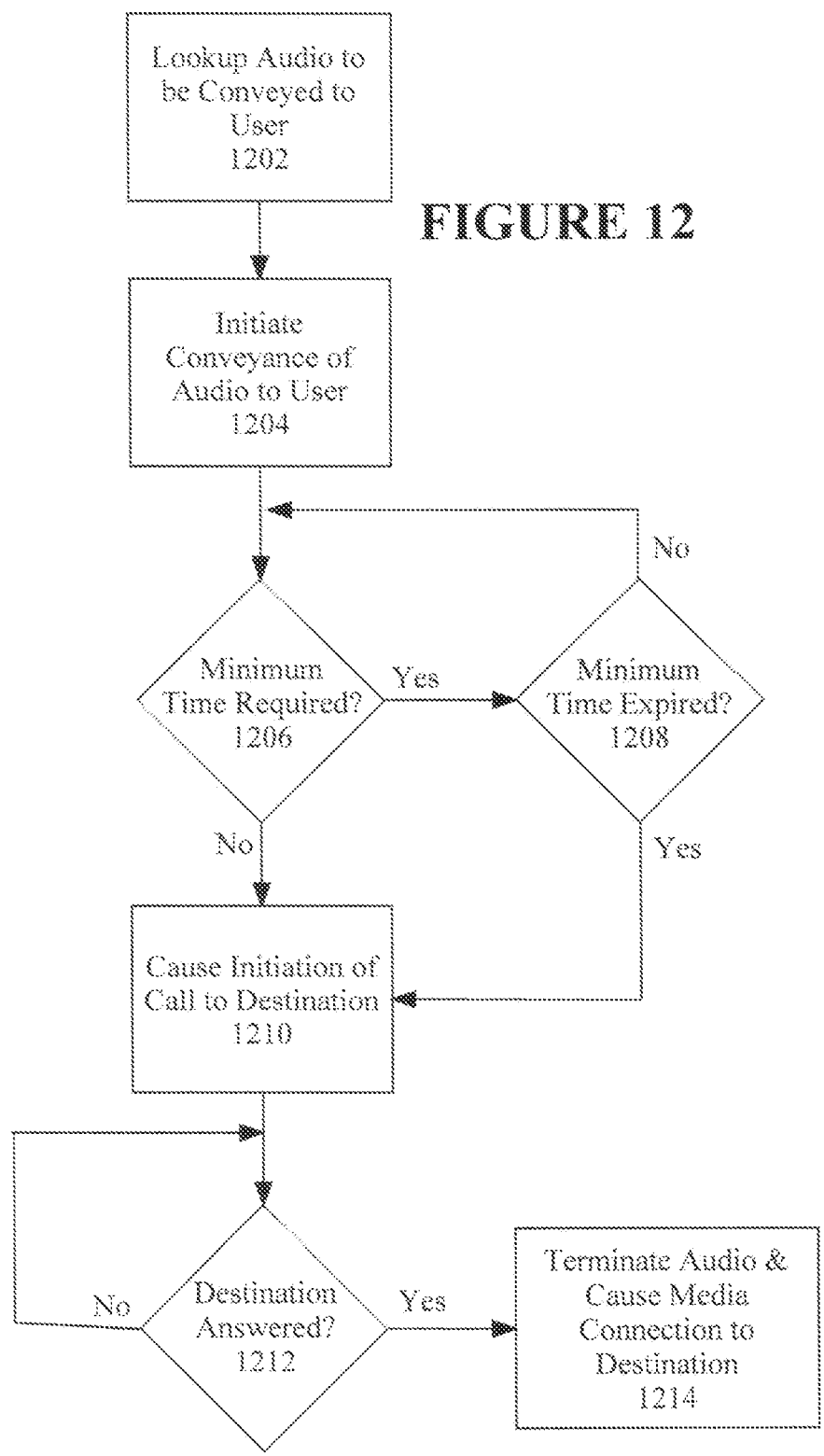
FIG. 12 is a flow chart depicting steps performed by the communication device of FIG. 11 according to an embodiment of the present invention.

FIG. 12 is a flow chart depicting steps performed by the processing entity 1102 within the communication device 1100 of FIG. 11 according to an embodiment of the present invention upon the initiation of an outgoing call from the communication device 1100. The flow chart of FIG. 12 is similar to that previously described with reference to FIG. 7 but the steps are performed by the processing entity 1102 within the communication device 1100 rather than the processing entity 202 within the call processing system 108. In the example implementation of FIG. 12, the outgoing call may be initiated through the PSTN 120 using SS7 signaling if the communication device 1100 comprises the first network interface 1106 or may be initiated through the IP network 130 using SIP if the communication device 1100 comprises the second network interface 1108. In some embodiments in which the communication device 1100 comprises both the first and second network interfaces 1106, 1108, the outgoing call may be initiated in either manner as selected by the processing entity 1102.

Upon the initiation of the outgoing call, as depicted in FIG. 12, the processing entity 1102 conducts a look-up at step 1202 to determine an audio element to be conveyed to the user of the communication device 1100 prior to the establishment of the call. The processing entity 1102 can perform the look-up on the database 1104 and/or another storage entity external to the communication device 1100 if the communication device comprises the second network interface 1108. In some embodiments, the destination identifier associated with the outgoing call may be used as a reference to locate a particular audio element and/or a random algorithm, a predetermined order in a list or temporal information (ex. time of day, week, year, etc.) may be used to select a particular audio element.

In some example implementations, during a provisioning stage, a user of the communication device 1100 may select an audio element from a set of potential audio elements offered by the processing entity 1102 or by a service provider that can control the processing entity 1102. In this case, the processing entity 1102, an entity enabled by the processing entity 1102 or an entity that controls the processing entity 1102 may offer a plurality of potential audio elements to the user of the communication device and subsequently receive selection information from the user, the selection information comprising an indication of at least one of the plurality of audio elements. The selection information may comprise an indication of at least one audio file and/or may comprise an indication of at least one audio stream broadcast on the IP network 130. In other embodiments, the user of the communication device may provide the processing entity 1102, an entity enabled by the processing entity 1102 or an entity that controls the processing entity 1102 with one or more audio elements that he/she would like to hear while waiting for the destination to accept an outgoing call. The audio element provided by the user of the communication device may be one or more audio files or a playlist of audio files. For instance, the subscriber may select/provide a particular song (ex "Kashmir" by Led Zeppelin or "Dead Puppies Are So Not Cool" by Samantha and the Cramps), a jingle (ex. seasonal melodies), elevator music, a motivational statement, a voice memo generated by the subscriber or another audio element as desired by the user. In some implementations, the user may select and/or provide a plurality of audio elements and the processing entity 1102 may select one of these audio elements based on a random algorithm, a predetermined order within a list or another condition such as temporal information (time of day, week, year, etc.).

In further implementations, an application such as iTunes may reside on the communication device 1100 in which a user has selected one or more audio files and/or generated one or more playlists of audio files. In this case, the processing entity 1102 may access the application to select an audio element to convey to the user of the communication device. In one implementation, the user of the communication device could generate a playlist of audio files specifically for the processing entity 1102 to use to convey to the user of the communication device 1100 during the establishment of an outgoing call. In other implementations, the processing entity 1102 may select one of the playlists or a plurality of audio files (ex. most played audio files, highest rated audio files) to convey to the user of the communication device 1100 during the establishment of an outgoing call.

As described previously, the audio element may take many different forms in various implementations including: one or more audio file(s) (ex. a song, a jingle, elevator music, a motivation statement, a voice memo generated by a user of the communication device, etc.) and an audio stream being transmitted from an audio stream component within the IP network 130 (ex. a radio broadcast, an audio portion of a television broadcast, a playlist of songs, a service announcement broadcast, a set of one or more advertisement messages and a reading of information (ex. news, weather, sport scores, stock quotes, a magazine, a newspaper, a podcast, a social media update (ex. Facebook, Twitter), etc.) or another audio stream that can be broadcast by an audio stream source and conveyed to a user of the communication device). In some implementations, the audio element(s) may be stored within the database 1104. In other implementations, if the communication device 1100 comprises the second network interface 1108, a location identifier may be stored within the database 1104 or another storage entity external to the call communication device 1100. The location identifier can be used to extract the audio element(s) by the processing entity 1102 from a network component within the IP network 130. For example, a location identifier could comprise a URL, a lookup reference within an audio element database or another identifier that allows the processing entity 1102 to locate the audio element(s) within or outside of the IP network 130.

Further, as previously described, the processing entity 1102 or another processing entity in communication with the processing entity 1102 could generate an audio element that is an audio representation of scheduling information associated with a user of the communication device 1100 after accessing the scheduling information from a source of scheduling information. The source of scheduling information may be an application in which the user has stored scheduling information. The scheduling information could be stored within the database 1104 or, if the communication device comprises the second network interface 1108, the scheduling information could be stored within another storage entity external to the communication device 1100. In one example, the scheduling information could be associated with an application that runs locally on the communication device 1100. In this case, the processing entity 1102 may access the application to receive the scheduling information associated with the user of the communication device. In another example, the scheduling information could be stored in a network component (not shown) within the IP network 130 or a data network coupled to the IP network 130. In this case, the network component may run a scheduling program, such as Outlook™ produced by Microsoft Corporation of Redmond, Wash. or Google Calendar produced by Google Inc. of Mountain View, Calif. The processing entity 1102 may access the location and login credential information of the scheduling information within the database 1104 or, if the communication device comprises the second network interface 1108, the processing entity 1102 may access the location and login credential information of the scheduling information from another storage entity external to the communication device 1100 using an identifier for the communication device 1100 or the user of the communication device 1100. The processing entity 1102 may then access the scheduling information from the network component storing the scheduling information through the IP network 130. The scheduling information, once accessed, can be used by the processing entity 1102 to generate an audio element. In a particular example, the processing entity 1102 could enable a text to voice function in order to create an audio representation of one or more events within the scheduling information. The processing entity 1102 may use the event(s) that will occur next to create the audio element. In alternative embodiments, a separate processing entity within the IP network 130 could be used to generate the audio element from the scheduling information.

Similarly to previously described, in some implementations, a user of the communication device 1100 may enable customized audio elements for particular destination identifiers. In this case, the processing entity 1102 may utilize the destination identifier to locate one or more particular audio element(s) to be conveyed. For example, a user may set-up one or more memo messages related to a particular individual associated with a destination identifier; link a particular destination identifier to reminder information; link a particular audio file to a particular destination identifier; or otherwise associate a particular audio element to a destination identifier. In one example, a subscriber may record a voice memo for a particular destination identifier to remind them of fact(s) concerning an individual associated with the destination identifier. As described above, the audio element(s) or location information associated with the audio element(s) may be stored within the database 1104 or, if the communication device 1100 comprises the second network interface 1108, the audio element(s) may be stored within another storage entity external to the communication device 1100.

Further, as previously described, in other embodiments, the service provider or another third party may select audio elements that are to be conveyed to a user of the communication device 1100. In these cases, audio elements may be provided directly by the service provider or another third party to the communication device 1100. In this case, the audio element may be linked to a user of the communication device 1100 or may be a general audio element. In some examples, the audio elements in this case may comprise general information from the service provider (ex. service interruption information, billing information, marketing information, seasonal greeting information, public service information, etc.) or advertising information from third parties as selected by the service provider or by a third party. The advertisements, in some implementations, may be linked to information known by the service provider concerning the subscriber and/or an entity associated with the destination identifier. As described above, the audio element(s) or location information associated with the audio element(s) may be stored within the database 1104 or, if the communication device 1100 comprises the second network interface 1108, the audio element(s) may be stored within another storage entity external to the communication device 1100.

As shown in FIG. 12, once the processing entity 1102 has looked up the audio element to be conveyed at step 1102, the processing entity 1102 initiates the conveyance of the audio element to the user of the communication device 1100 at step 1204. The conveyance of the audio element may comprise playing the audio element over the speaker 1110, playing the audio element within the handset 1112 and/or playing the audio element over another component that can transmit audio waves to the user of the communication device 1100. In other implementations in which the communication device 1100 comprises the second network interface 1108, the conveyance of the audio element may comprise establishing a media connection between the communication device 1100 and a network component within the IP network 130 or another data network coupled to the IP network 130 that may stream the audio element to the communication device 1100. In this case, the processing entity 1102 initiates the establishment of the media connection and forwards the streamed audio element to the speaker 1110 and/or the handset 1112. It should be understood that the means for conveyance of the audio element to the user of the communication device 1100 may be determined at least partially upon the audio element that is to be conveyed. The conveyance of an audio element to a user of the communication device for two example scenarios will be described with reference to FIG. 13.

In some embodiments of the present invention, other media elements could be conveyed to user of the communication device 1100 along with or instead of an audio element. For example, if the communication device 1100 can support a display (not shown) capable of projecting visual data such as video, images and/or text (ex. multimodal phones, smart phones, computer screen associated with the source device etc.), the processing entity 1102 could look-up other media elements such as video, images or text information and convey these other media elements on the display (not shown) of the communication device 1100. In this case, a user of the communication device 1100 may be able to view video, images and/or text information on the display (not shown) prior to (and possibly during) the call being established with the destination device. Similar to the various embodiments described, the other media elements could include information selected by a user of the communication device 1100, information related to an entity associated with the destination identifier (ex. memos related to the entity, images/videos of the entity, etc.), information selected by a service provider or third party (ex. alert, advertisement, account information, etc.) or other data that can be visually displayed on a display at the communication device 1100.

In some embodiments of the present invention, the processing entity 1102 determines whether an audio element being conveyed has a minimum conveyance time that is required at step 1206. A minimum time may be required or desired for the conveying of an audio element if particular information is required or desired to be conveyed to the user of the source device prior to the outgoing call being established with the destination device. This may be the case for audio elements such as voice memos, reminders, or other audio elements that convey information. If a minimum time is required at step 1206, the processing entity 1102 will wait the required minimum time at step 1208 before connecting the call. The processing entity 1202 may be provided with minimum time information along with the audio element or may receive an indication that signifies that the full audio element needs to be played. It should be understood that in some embodiments, no minimum time requirement is needed and steps 1206 and 1208 are not implemented by the processing entity 1102.

If the minimum time is not required at step 1206 or if the minimum time has expired at step 1208, the processing entity 1102 causes the initiation of a call to the destination device using the destination identifier at step 1210. In some embodiments, the initiation of a call to the destination device occurs only after the minimum time has expired at step 710 though, in other embodiments, no such delay may occur. The initiation of the call can be performed in many manners and will depend upon the network that the destination device is connected to and the protocols the network utilizes.

After causing initiation of the call to the destination device at step 1210, the processing entity waits for the destination device to answer the call at step 1212. During this waiting period, when a traditional "ring tone" audio would normally be provided to the user of the communication device 1100, the processing entity 1102, according to embodiments of the present invention, continues to convey the audio element(s) to the user of the communication device 1100. If the audio element ends during this waiting period, the processing entity 1102 may either convey the audio element an additional time, convey another audio element (ex. another song, ring tone) or stop conveying audio to the user of the communication device 1100.

Once the destination device answers the call, the processing entity 1102, as depicted in step 1214, proceeds to terminate the conveying of the audio element and cause a media connection to be established between the communication device 1100 and the desired destination device. The terminating conveying of the audio element may be prior to or substantially simultaneous with the establishment of the media connection between the communication device and the destination device. This media connection can be established in a number of manners and may be controlled by network components such as the SSP 102 or the call processing system 108 described previously.

Within some embodiments of the present invention, steps of FIG. 12 are performed by the processing entity 1102 in response to the processing entity 1102 detecting an initiation of a call to a destination device by the user of the communication device 1100. The processing entity 1102 may detect an initiation of a call by the user of the communication device 1100 in a number of ways. In some implementations, the processing entity 1102 is integral to the user of the communication device 1100 initiating a call to the destination device. For example, the processing entity 1102 may provide access to a virtual keypad and/or an address book to the user, receive electronic signals to initiate a call to the destination device, receive DTMF tones from buttons pressed by the user, and/or otherwise receive an intent to call the destination device from the user. In some cases, the processing entity 1102 causes establishment of the media connection between the communication device 1100 and the destination device by transmitting DTMF tones to a SSP within the PSTN 120 or by transmitting a call request message using SIP to a call processing system, such as the call processing system 108, via the IP network 130 or another data network. In other embodiments, the processing entity 1102 is not directly involved in the establishment of the media connection between the communication device 1100 and the destination device. In this case, the processing entity 1100 may detect the initiation of a call to the destination device in other manners such as detecting a ring tone being received from a network component such as an SSP via the PSTN 120 or a call processing system, such as the call processing system 108, via the IP network 130. In embodiments of the present invention, whether the processing entity 1102 is involved in establishment of the media connection between the communication device 1100 and the destination device or not, if a traditional ring tone is received at the communication device 1100 from a network component due to the initiation of the outgoing call to the destination device, the processing entity 1102 replaces the traditional conveyance of the ring tone to the user of the communication device 1100 with the conveyance of the audio element.

Figure 13:
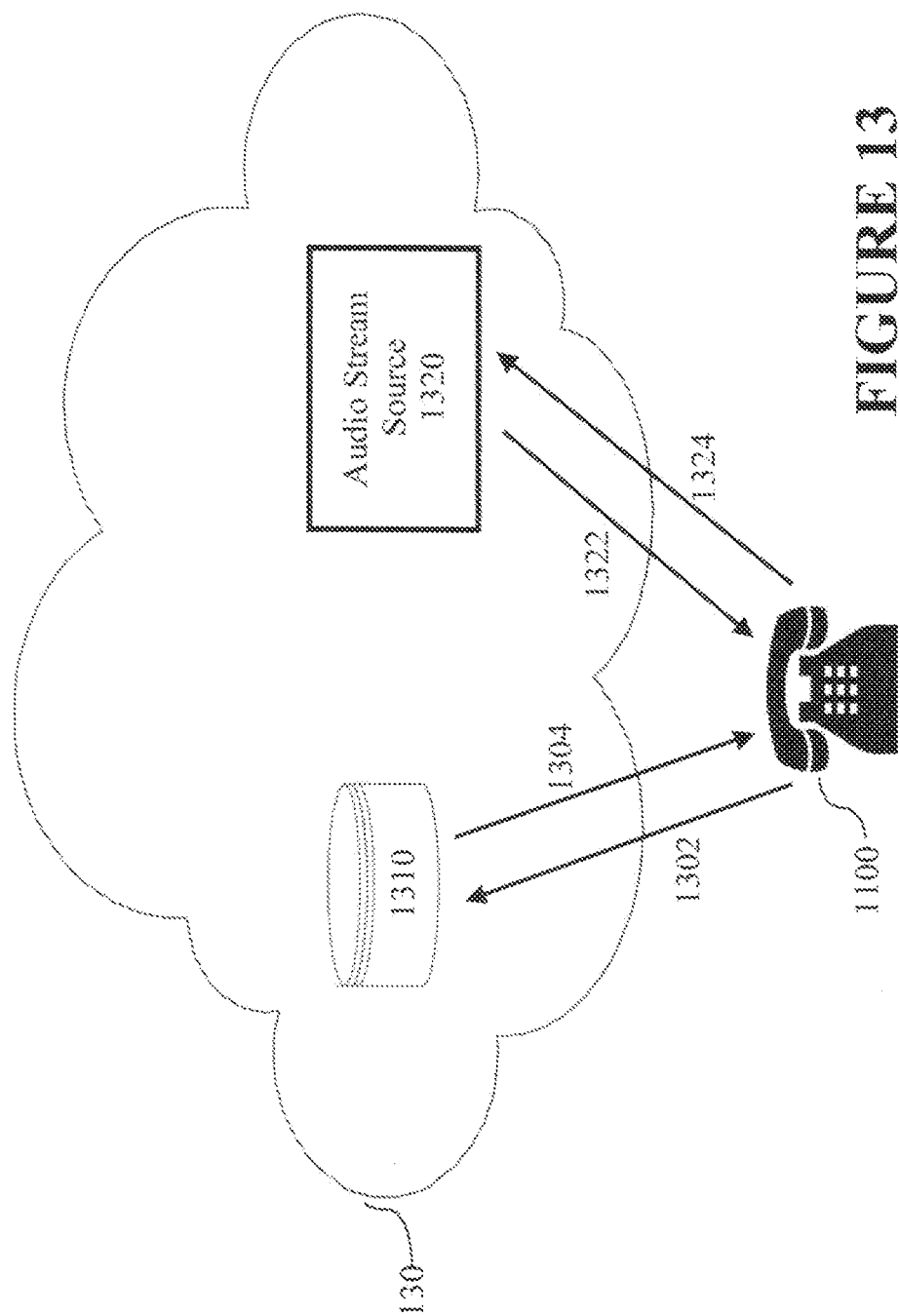
FIG. 13 is a simplified network block diagram illustrating two example scenarios for conveying an audio element to a user using the communication device of FIG. 11.

FIG. 13 is a simplified network block diagram illustrating two example scenarios for conveying an audio element (step 1204 within FIG. 12) to a user using the communication device of FIG. 11. In a first scenario, the audio element is an audio file stored within a content database 1310, the content database 1310 being a network component within the IP network 130 or another data network coupled to the IP network 130. In a second scenario, the audio element is an audio stream transmitted by an audio stream source 1320, which may be controlled by the same or a different entity from a service provider that operates the network on which the communication device 1100 makes/receives telephone calls.

As shown in FIG. 13 for these particular scenarios, the communication device 1100 is coupled to the IP network 130 and both the content database 1310 and the audio stream source 1320 are within the IP network 130, though one or both of the content database 1310 and the audio stream source 1320 could be within a different data network coupled to the IP network 130. In operation within both scenarios, after a call is initiated at the communication device 1100, as described previously with reference to FIG. 12, the processing entity 1102 within the communication device 1100 determines an audio element to convey to a user of the communication device 1100 prior to the call being established.

The content database 1310 comprises a plurality of audio files that may include, but are not limited to, songs, jingles, elevator music, motivational statements, marketing messages, advertisements, service announcements and voice memos. In the first scenario of FIG. 13, the audio element to be conveyed to the user of the communication device 1100 is one or more audio file(s) stored within the content database 1310. The audio file(s) may have been selected by the user of the communication device 1100 during a prior provisioning stage or may be selected by another entity such as the service provider that enables the communication device 1100 to make/receive calls or a third party entity (ex. advertiser, government, etc.) enabled by the service provider or the user of the communication device 1100. In the case of the user selecting one or more audio file(s) during a prior provisioning stage, in some implementations, the user may select the audio file(s) via an application on the communication device 1100 controlled by the processing entity 1102 or via a web-based interface with the content database 1310 or through another communication interface (ex. web application, telephone, application on a telephone, etc.) with an entity that operates the content database 1310 or another entity enabled by the service provider. In some example implementations, during a provisioning stage, a user of the communication device 1100 may select an audio element from a set of potential audio elements offered by the processing entity 1102 or by a service provider that can control the processing entity 1102. In this case, the processing entity 1102, an entity enabled by the processing entity 1102 or an entity that controls the processing entity 1102 may offer a plurality of potential audio elements to the user of the communication device 1100 and subsequently receive selection information from the user, the selection information comprising an indication of at least one of the plurality of audio elements. The selection information may comprise an indication of at least one audio file and/or may comprise an indication of at least one audio stream broadcast on the IP network 130. In other embodiments, the user of the communication device may provide the processing entity 1102, an entity enabled by the processing entity 1102 or an entity that controls the processing entity 1102 with one or more audio elements that he/she would like to hear while waiting for the destination to accept an outgoing call. The audio element provided by the user of the communication device may be one or more audio files or a playlist of audio files. In an alternative implementation, the processing entity 1102 may determine user selected audio file(s) by accessing audio file(s) and/or playlist(s) previously selected by the user for other purposes (ex. playlists within iTunes on the communication device or on an external computer or a web-based music website), presuming that the processing entity 1102 has been given proper permission to access such information.

In the first scenario of FIG. 13, upon looking up the audio element to be conveyed to the user of the communication device 1100, the processing entity 1102 transmits an audio file request 1302 to the content database 1310 via the IP network 130. Upon receiving the audio file request 1302, the content database 1310 accesses the requested audio file(s), establishes a media connection 1304 with the communication device 1100 and plays the audio file(s) over the media connection 1304, the processing entity 1102 forwarding the streamed audio file(s) to the speaker 1110 and/or the handset 1112 in order to convey the audio file(s) to the user of the communication device 1100. In another alternative implementation, rather than play the audio file(s), the content database 1310 may transfer the audio file(s) to the communication device 1100 and the actual playing of the audio file(s) may be performed by the processing entity 1102. In these cases, a sufficiently high bandwidth connection is required to transfer the audio file(s) such that the file transfer does not noticeably delay the playing of the audio file(s) to a user of the communication device 1100.

The audio stream source 1320 may comprise a server or other network component (ex. networked computer, etc.) that is operable to transmit streamed audio content to network components within the IP network 130 or other connected networks. The network components receiving the streamed audio content may include the communication device 1100. In some particular implementations, the audio stream source 1320 comprises a web server that is operable to continuously stream an online radio broadcast, an audio portion of a television broadcast, a playlist of songs, a service announcement broadcast, a set of one or more advertisement messages, a reading of information (ex. news, weather, sport scores, stock quotes, a magazine, a newspaper, a podcast, a social media update (ex. Facebook, Twitter), etc.) or other audio content as one may desire to stream on a data network. In the second scenario of FIG. 13, the audio element to be conveyed to the user of the communication device 1100 is an audio stream that is transmitted by the audio stream source 1320. The audio stream to be conveyed to the user of the communication device 1100 may have been selected by the user during a prior provisioning stage or may be selected by another entity such as a service provider that enables the communication device 1100 to make/receive calls or a third party entity (ex. advertiser, government, etc.) enabled by the service provider or the user of the communication device 1100. Similar to that described above for the first scenario of FIG. 13, in the case of the user of the communication device 1100 selecting an audio stream during a prior provisioning stage, in some implementations, the user may select the audio stream via an application on the communication device 1100 controlled by the processing entity 1102 or via a web-based interface with the audio stream source 1320 or through another communication interface (ex. web application, telephone, application on a telephone, etc.) with an entity that operates the audio stream source 1320 or another entity enabled by the service provider. In some example implementations, during a provisioning stage, a user of the communication device 1100 may select an audio stream from a set of potential audio streams offered by the processing entity 1102 or by a service provider that can control the processing entity 1102. In this case, the processing entity 1102, an entity enabled by the processing entity 1102 or an entity that controls the processing entity 1102 may offer a plurality of potential audio streams to the user of the communication device 1100 and subsequently receive selection information from the user, the selection information comprising an indication of at least one of the plurality of audio streams.

In the second scenario of FIG. 13, upon looking up the audio element to be conveyed to the user of the communication device 1100, the processing entity 1102 transmits an audio stream request 1322 to the audio stream source 1320. The audio stream request 1322 may comprise IP packets that request a media connection 1324 to be established between the audio stream source 1320 and the communication device 1100. In some cases, the audio stream request 1322 may comprise a URL of a particular audio stream or another identifier that is associated with a particular audio stream. Upon receiving the audio stream request 1322, the audio stream source 1320 establishes a media connection 1324 with the communication device 1100 and initiates transmitting of the selected audio stream over the media connection 1324, the processing entity 1102 forwarding the audio stream to the speaker 1110 and/or the handset 1112 in order to convey the audio stream to the user of the communication device 1100.

As described previously, in some embodiments of the present invention, other media elements could be conveyed to the communication device 1100 along with or instead of an audio element. In FIG. 13, other elements could be stored within the content database 1310 and these additional media elements such as video, images and/or text could be conveyed to the communication device 1100 along with, or instead of, the audio file(s). Further, the audio stream source 1320 could be a media stream source that is operable to transmit other media elements such as video, images and/or text along with, or instead of, the audio stream to the communication device 1100. In both of these cases, the communication device 1100 would require a display (not shown) capable of displaying visual data.

Those skilled in the art will appreciate that, in some embodiments, certain functionality of a given element described herein (e.g., the processing entity 202) may be implemented as pre-programmed hardware or firmware components (e.g., application specific integrated circuits (ASICs), electrically erasable programmable read-only memories (EEPROMs), etc.) or other related components. In other embodiments, a given element described herein (e.g., the processing entity 202) may comprise a processor having access to a memory which stores program instructions for operation of the processor to implement functionality of that given element. The program instructions may be stored on a data storage medium that is fixed, tangible, and readable directly by the given element. The data storage medium may store data optically (e.g., an optical disk such as a CD-ROM or a DVD), magnetically (e.g., a hard disk drive, a removable diskette), electrically (e.g., semiconductor memory, floating-gate transistor memory, etc.), or in various other ways. Alternatively, the program instructions may be stored remotely but transmittable to the given element via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

What is claimed is:

1. A method implemented by an end-user communication device operable to originate telephonic calls comprising:

receiving a selection of an audio element of a plurality of audio elements from a user of the communication device prior to initiation of an outgoing call from the communication device to a destination device;

initiating conveyance of the audio element to the user of the communication device in response to detecting the initiation of the outgoing call to the destination device; and terminating conveyance of the audio element to the user of the communication device prior to or substantially simultaneous with establishment of the call between the communication device and the destination device.

2. A method according to claim 1, wherein the receiving the selection of the audio element from the user of the communication device comprises offering a plurality of potential audio elements to the user and receiving selection information from the user, the selection information comprising an indication of at least one of the plurality of potential audio elements.

3. A method according to claim 1, wherein the receiving the selection of the audio element from the user comprises receiving an indication of an audio file.

4. A method according to claim 3, wherein the receiving the indication of the audio file comprises accessing an application on the communication device in which the user has selected at least one audio file.

5. A method according to claim 4, wherein the application on the communication device comprises at least one playlist of audio files and the receiving the indication of the audio file further comprises receiving an indication of one or more audio files within the playlist.

6. A method according to claim 1, wherein the receiving the selection of the audio element from the user comprises receiving an indication of at least one audio stream broadcast on a data network.

7. A method according to claim 3, wherein the indication of the audio file comprises a location of the audio file within a database local to the communication device; and wherein the initiating conveyance of the audio element to the user of the communication device comprises accessing the audio file within the database local to the communication device and playing the audio file to the user of the communication device.

8. A method according to claim 3, wherein the indication of the audio file comprises a location of the audio file within a database remote from the communication device; and wherein the initiating conveyance of the audio element to the user of the communication device comprises transmitting a request to the remote database to play the audio file over a media connection between the remote database and the communication device.

9. A method according to claim 6, wherein the indication of the audio stream comprises a location on the data network of an audio stream source that broadcasts the audio stream; and wherein the initiating conveyance of the audio element to the user of the communication device comprises transmitting a request to the audio stream source to transmit the audio stream over a media connection between the audio stream source and the communication device.

10. A method according to claim 6, wherein the audio stream comprises at least one of a radio broadcast, an audio portion of a television broadcast, a playlist of songs, a service announcement broadcast, a set of one or more advertisement messages and a reading of information.

11. A method according to claim 1, wherein the receiving the selection of the audio element from the user of the communication device comprises receiving a selection of an audio element associated with a particular destination device; and the initiating conveyance of the audio element to the user of the communication device occurs if the destination device of the outgoing call is the particular destination device.

12. A method according to claim 11, wherein the audio element comprises a message for the user of the communication device associated with a user of the destination device.

13. A method according to claim 1, wherein the receiving the selection of the audio element from the user of the communication device comprises receiving a selection of a plurality of audio elements and an indication to use a random algorithm to select audio elements to convey to the user of the communication device during establishment of outgoing calls.

14. A method according to claim 1, wherein the receiving the selection of the audio element from the user of the communication device comprises receiving a selection of a plurality of audio elements and an indication to use a predetermined order to select audio elements to convey to the user of the communication device during establishment of outgoing calls.

15. A method according to claim 1, wherein the receiving the selection of the audio element from the user of the communication device comprises receiving a selection of a plurality of audio elements and an indication to use temporal information to select audio elements to convey to the user of the communication device during establishment of outgoing calls.

16. A method according to claim 1, wherein the initiating conveyance of the audio element to the user of the communication device replaces a traditional conveyance of a tone to the user of the communication device during initiation of an outgoing call, the tone being received from a network component.

17. A method according to claim 1 further comprising causing establishment of a media connection between the communication device and the destination device in response to detecting the initiation of the call to the destination device by the user of the communication device.

18. A method according to claim 17, wherein the causing establishment of the media connection between the communication device and the destination device comprises transmitting Dual Tone Multi-Frequency (DTMF) tones to a Service Switching Point (SSP).

19. A method according to claim 17, wherein the causing establishment of the media connection between the communication device and the destination device comprises transmitting a call request message to a call processing system via a data network.

20. A method according to claim 17, wherein the causing establishment of the media connection between the communication device and the destination device comprises causing initiation of a media connection with the destination device and detecting acceptance from the destination device of the outgoing call.

21. A method according to claim 20, wherein the terminating conveyance of the audio element to the user of the communication device is in response to detecting the acceptance from the destination device of the outgoing call.

22. A method according to claim 20 further comprising determining a minimum time period to convey the audio element; and wherein the causing initiation of the media connection with the destination device is in response to the minimum time period expiring.

23. A method according to claim 22, wherein the terminating conveyance of the audio element to the user of the communication device is in response to detecting the acceptance from the destination device of the outgoing call.

24. A method according to claim 1 further comprising determining a time period to convey the audio element; and wherein the terminating conveyance of the audio element to the user of the communication device is in response to the time period expiring.

25. A method according to claim 1 further comprising:
receiving a selection of a media element from the user of the communication device to convey to a display within the communication device; wherein the media element is to be conveyed to the display during establishment of the outgoing call; and
initiating conveyance of the media element to the display within the communication device in response to detecting the initiation of the outgoing call to the destination device.

26. A method according to claim 25, wherein the media element comprises at least one of a video element, an image element and a text element.

27. An end-user communication device comprising:
a network interface operable to be coupled to a network over which the communication device may initiate an outgoing call to a destination device; and
a processing entity operable to receive a selection of an audio element of a plurality of audio elements from a user of the communication device prior to initiation of an outgoing call from the communication device to a destination device; to initiate conveyance of the audio element to the user of the communication device in response to detecting the initiation of the outgoing call to the destination device; and to terminate conveyance of the audio element to the user of the communication device prior to or substantially simultaneous with establishment of the call between the communication device and the destination device.

28. A communication device according to claim 27, wherein, to receive the selection of the audio element from the user, the processing entity is operable to offer a plurality of potential audio elements to the user and to receive selection information from the user, the selection information comprising an indication of at least one of the plurality of potential audio elements.

29. A communication device according to claim 27, wherein, to receive the selection of the audio element from the user, the processing entity is operable to receive an indication of an audio file.

30. A communication device according to claim 29, wherein, to receive the indication of the audio file, the processing entity is operable to access an application on the communication device in which the user has selected at least one audio file.

31. A communication device according to claim 30, wherein the application on the communication device comprises at least one playlist of audio files and, to receive the indication of the audio file, the processing entity is further operable to receive an indication of one or more audio files within the playlist.

32. A communication device according to claim 27, wherein, to receive the selection of the audio element from the user, the processing entity is operable to receive an indication of at least one audio stream broadcast on a data network.

33. A communication device according to claim 29 further comprising a database; and wherein the indication of the audio file comprises a location of the audio file within the database; and wherein, to initiate conveyance of the audio element to the user of the communication device, the processing entity is operable to access the audio file within the database and to play the audio file to the user of the communication device.

34. A communication device according to claim 29, wherein the indication of the audio file comprises a location of the audio file within a database remote from the communication device; and wherein, to initiate conveyance of the audio element to the user of the communication device, the processing entity is operable to transmit a request to the remote database to play the audio file over a media connection between the remote database and the communication device.

35. A communication device according to claim 32, wherein the indication of the audio stream comprises a location on the data network of an audio stream source that broadcasts the audio stream; and wherein, to initiate conveyance of the audio element to the user of the communication device, the processing entity is operable to transmit a request to the audio stream source to transmit the audio stream over a media connection between the audio stream source and the communication device.

36. A communication device according to claim 32, wherein the audio stream comprises at least one of a radio broadcast, an audio portion of a television broadcast, a playlist of songs, a service announcement broadcast, a set of one or more advertisement messages and a reading of information.

37. A communication device according to claim 27, wherein, the selection of the audio element comprises an audio element associated with a particular destination device; and the processing entity is operable to only initiate conveyance of the audio element to the user of the communication device if the destination device of the outgoing call is the particular destination device.

38. A communication device according to claim 37, wherein the audio element comprises a message for the user of the communication device associated with a user of the destination device.

39. A communication device according to claim 27, wherein, to receive the audio element from the user of the communication device, the processing entity is operable to receive a selection of a plurality of audio elements and an indication to use a random algorithm to select audio elements to convey to the user of the communication device during establishment of outgoing calls.

40. A communication device according to claim 27, wherein, to receive the audio element from the user of the communication device, the processing entity is operable to receive a selection of a plurality of audio elements and an indication to use a predetermined order to select audio elements to convey to the user of the communication device during establishment of outgoing calls.

41. A communication device according to claim 27, wherein, to receive the audio element from the user of the communication device, the processing entity is operable to receive a selection of a plurality of audio elements and an indication to use temporal information to select audio elements to convey to the user of the communication device during establishment of outgoing calls.

42. A communication device according to claim 27, wherein the processing entity is operable to replace a traditional conveyance of a tone received from a network component to the user of the communication device during initiation of the outgoing call with the conveyance of the audio element to the user of the communication device.

43. A communication device according to claim 27, wherein the network interface is operable to cause establishment of a media connection between the communication device and the destination device in response to detecting the initiation of the call to the destination device by the user of the communication device.

44. A communication device according to claim 43, wherein, to cause establishment of the media connection between the communication device and the destination device, the network interface is operable to transmit Dual Tone Multi-Frequency (DTMF) tones to a Service Switching Point (SSP).

45. A communication device according to claim 43, wherein, to cause establishment of the media connection between the communication device and the destination device, the network interface is operable to transmit a call request message to a call processing system via a data network.

46. A communication device according to claim 43, wherein, to cause establishment of the media connection between the communication device and the destination device, the processing entity is operable to cause initiation of a media connection with the destination device and to detect acceptance from the destination device of the outgoing call.

47. A communication device according to claim 46, wherein the processing entity is operable to terminate conveyance of the audio element to the user of the communication device in response to detecting the acceptance from the destination device of the outgoing call.

48. A communication device according to claim 46, wherein the processing entity is further operable to determine a minimum time period to convey the audio element; and wherein the processing entity is operable to cause initiation of the media connection with the destination device in response to the minimum time period expiring.

49. A communication device according to claim 48, wherein the processing entity is operable to terminate conveyance of the audio element to the user of the communication device in response to detecting the acceptance from the destination device of the outgoing call.

50. A communication device according to claim 27, wherein the processing entity is further operable to determine a time period to convey the audio element; and wherein the processing entity is operable to terminate conveyance of the audio element to the user of the communication device in response to the time period expiring.

51. A communication device according to claim 27, wherein the network over which the communication device may initiate the outgoing call to the destination device comprises an Internet Protocol (IP) network.

52. A communication device according to claim 27, wherein the network over which the communication device may initiate the outgoing call to the destination device comprises the Public Switched Telephone Network (PSTN).

53. A communication device according to claim 27, wherein the network over which the communication device may initiate the outgoing call to the destination device comprises the Public Switched Telephone Network (PSTN) and the network interface is further operable to communicate over a data network.

54. A communication device according to claim 53, wherein the selection of the audio element comprises a location of the audio file within a database within the data network; and wherein, to initiate conveyance of the audio element to the user of the communication device, the processing entity is operable to transmit a request to the database to play the audio file over the data network to the communication device.

55. A communication device according to claim 53, wherein the selection of the audio element comprises a location on the data network of an audio stream source that broadcasts an audio stream; and wherein, to initiate conveyance of the audio element to the user of the communication device, the processing entity is operable to transmit a request to the audio stream source to transmit the audio stream over the data network to the communication device.

56. A communication device according to claim 27 further comprising a display; and wherein the processing entity is further operable:
to receive a selection of a media element from the user of the communication device to convey to the display; wherein the media element is to be conveyed to the display during establishment of the outgoing call; and
to initiate conveyance of the media element to the display in response to detecting the initiation of the outgoing call to the destination device.

57. A communication device according to claim 56, wherein the media element comprises at least one of a video element, an image element and a text element.

58. Non-transitory computer-readable media containing a program element executable by an end-user communication device operable to originate telephonic calls, the program element comprising:
first program code for receiving a selection of an audio element of a plurality of audio elements from a user of the communication device prior to initiation of an outgoing call from the communication device to a destination device;
second program code for initiating conveyance of the audio element to the user of the communication device in response to detecting the initiation of the outgoing call to the destination device by the user of the communication device; and
third program code for terminating conveyance of the audio element to the user of the communication device prior to or substantially simultaneous with establishment of the call between the communication device and the destination device.

59. A method implemented by an end-user communication device operable to originate telephonic calls comprising:
accessing scheduling information associated with a user of the communication device within a source of scheduling information;
initiating conveyance of an audio representation of the scheduling information associated with the user of the communication device to the user of the communication device in response to detecting an initiation of an outgoing call to a destination device by the user; and
terminating conveyance of the audio representation of the scheduling information to the user of the communication device prior to or substantially simultaneous with establishment of the call between the communication device and the destination device.

60. A method according to claim 59, wherein the source of scheduling information is a database local to the communication device which is associated with an application in which the user of the communication device has stored scheduling information; and wherein the accessing scheduling information associated with the user of the communication device comprises accessing the application in which the user of the communication device has stored scheduling information.

61. A method according to claim 59, wherein the source of scheduling information is a database remote to the communication device in which the user of the communication device has stored scheduling information; and wherein the accessing scheduling information associated with the user of the communication device comprises accessing the database via a data network.

62. A method according to claim 59 further comprising causing establishment of a media connection between the communication device and the destination device in response to detecting the initiation of the call to the destination device by the user of the communication device.

63. A method according to claim 62, wherein the causing establishment of the media connection between the communication device and the destination device comprises causing initiation of a media connection with the destination device and detecting acceptance from the destination device of the outgoing call.

64. A method according to claim 62, wherein the terminating conveyance of the audio element to the user of the communication device is in response to detecting the acceptance from the destination device of the outgoing call.

65. A method according to claim 62 further comprising determining a minimum time period to convey the audio representation of the scheduling information; and wherein the causing initiation of the media connection with the destination device is in response to the minimum time period expiring.

66. A method according to claim 65, wherein the terminating conveyance of the audio element to the user of the communication device is in response to detecting the acceptance from the destination device of the outgoing call.

67. A method according to claim 59 further comprising determining a time period to convey the audio representation of the scheduling information; and wherein the terminating conveyance of the audio element to the user of the communication device is in response to the time period expiring.

68. An end-user communication device comprising:
a network interface operable to be coupled to a network over which the communication device may initiate an outgoing call to a destination device; and
a processing entity operable to access scheduling information associated with the user of the communication device within a source of scheduling information; to initiate conveyance of an audio representation of the scheduling information associated with the user of the communication device to the user of the communication device in response to detecting an initiation of an outgoing call to the destination device; and to terminate conveyance of the audio representation of the scheduling information to the user of the communication device prior to or substantially simultaneous with establishment of the call between the communication device and the destination device.

69. A communication device according to claim 68 further comprising a database which is the source of scheduling information, the database being associated with an application in which the user of the communication device has stored scheduling information; wherein, to access scheduling information associated with the user of the communication device, the processing entity is operable to access the application in which the user of the communication device has stored scheduling information.

70. A communication device according to claim 68, wherein the source of scheduling information is a database remote to the communication device in which the user of the communication device has stored scheduling information; and wherein, to access scheduling information associated with the user of the communication device, the processing entity is operable to access the database via a data network.

* * * * *